US00RE36590E

United States Patent [19]

Yanagi

[11] E Patent Number: Re. 36,590

[45] Reissued Date of Patent: Feb. 29, 2000

[54] APPARATUS AND METHOD FOR ACCURATELY SCANNING A LIGHT BEAM ACROSS TRACKS OF A RECORDING MEDIUM

[75] Inventor: Shigenori Yanagi, Kawasaki, Japan

[73] Assignee: Fujitsu Limited, Kanagawa, Japan

[21] Appl. No.: 08/698,761

[22] Filed: Aug. 16, 1996

Related U.S. Patent Documents

Reissue of:

[64] Patent No.: 5,121,370
Issued: Jun. 9, 1992
Appl. No.: 08/265,460
Filed: Aug. 25, 1998

U.S. Applications:

[63] Continuation of application No. 08/257,152, filed as application No. PCT/JP88/00844, Aug. 25, 1988, abandoned.

[30] Foreign Application Priority Data

| | | | |
|---|---|---|---|
| Aug. 29, 1987 | [JP] | Japan | 62-215996 |
| Sep. 1, 1987 | [JP] | Japan | 62-218754 |
| Oct. 20, 1987 | [JP] | Japan | 62-264125 |

[51] Int. Cl.[7] ..... G11B 7/085

[52] U.S. Cl. ..... 369/32; 369/44.28; 369/44.29; 369/54

[58] Field of Search ..... 369/32, 44.28, 369/44.29, 44.35, 54, 58; 360/78.04–78.07

[56] References Cited

U.S. PATENT DOCUMENTS

| | | | |
|---|---|---|---|
| 4,106,058 | 8/1978 | Romeas et al. . | |
| 4,375,091 | 2/1983 | Dakin et al. . | |
| 4,397,009 | 8/1983 | Eriksson | 369/32 |
| 4,484,319 | 11/1984 | Koishi et al. | 369/32 X |
| 4,495,608 | 1/1985 | Kimura et al. | 369/33 |
| 4,562,562 | 12/1985 | Moriya et al. | 369/32 |
| 4,567,534 | 1/1986 | Groen et al. | 369/32 X |
| 4,615,023 | 9/1986 | Inada et al. | 369/32 |
| 4,697,256 | 9/1987 | Shinkai | 369/32 |
| 4,740,939 | 4/1988 | Kimura et al. | 369/32 X |
| 4,774,699 | 9/1988 | Giddings | 369/32 |
| 4,779,251 | 10/1988 | Burroughs | 369/32 |
| 4,845,698 | 7/1989 | Baas | 369/32 |
| 4,847,821 | 7/1989 | Baas . | |

FOREIGN PATENT DOCUMENTS

| | | |
|---|---|---|
| 0048441 | 3/1982 | European Pat. Off. . |
| 0090379 | 10/1983 | European Pat. Off. . |
| 0098076 | 1/1984 | European Pat. Off. . |
| 0138245 | 4/1986 | European Pat. Off. . |
| 0176185 | 4/1986 | European Pat. Off. . |
| 31 21 013 A1 | 3/1982 | Germany . |
| 35 20 189 A1 | 12/1986 | Germany . |
| 3543568 | 6/1987 | Germany . |
| 57-55542 | 4/1982 | Japan . |
| 57-64337 | 4/1982 | Japan . |
| 58-166567 | 10/1983 | Japan . |
| 62-125543 | 6/1987 | Japan . |
| 62-170031 | 7/1987 | Japan . |

*Primary Examiner*—W. R. Young
*Attorney, Agent, or Firm*—Staas & Halsey

[57] ABSTRACT

A lens is accelerated on a coarse tracking carriage while enabling a lens position servo, which moves the carriage so that the lens returns to a neutral position on the carriage. After the beam spot becomes fast enough, the carriage is accelerated and decelerated until the beam spot arrives near a destination track; then, the lens is decelerated on the carriage to stop on the destination track. The method does not require a stop at each track which is to be crossed. In a second method, the carriage is first accelerated while the fine tracking servo is enabled to trace a start track. After the carriage becomes fast enough that eccentricity of the tracks will not prohibit a correct jump, the fine tracking servo is disabled. The beam spot is then moved by a lens lock force which returns the lens to the neutral position on the carriage. The carriage is further accelerated and decelerated, and then the lens is decelerated in the same manner as the first method.

94 Claims, 20 Drawing Sheets

APPARATUS AND METHOD FOR ACCURATELY SCANNING A LIGHT BEAM ACROSS TRACKS OF A RECORDING MEDIUM

Matter enclosed in heavy brackets [ ] appears in the original patent but forms no part of this reissue specification; matter printed in italics indicates the additions made by reissue.

*This application is a continuation of application Ser. No. 08/257,152, filed Jun. 9, 1994, now abandoned, which is a Reissue of 07/265,460, U.S. Pat. No. 5,121,370, which is a 371 of PCT/JP88/00844, filed Aug. 25, 1988.*

BACKGROUND OF THE INVENTION

1. Field of the Invention

This invention relates to a method of track accessing in an optical recording apparatus and, in particular, to a novel technique for a beam spot to quickly cross the plural tracks while the number of tracks the beam spot has crossed is accurately checked.

2. Description of Related Art

An optical recording disk system is hereinafter described as an example of prior art optical recording systems. In an optical recording disk system, as shown in FIG. 1A, data is written onto a recording track on a recording medium, a disk 1, by a beam spot focused thereon and the data is read out from a reflected light therefrom. The system employed in FIG. 1A is constituted as follows. The optical recording disk 1 is rotating around its axle driven by a motor 1*a*. An optical head 2 coarsely travels along a radial direction of the disk which is driven by a motor. The motor which is not shown is controlled by a carriage controller 5. The optical head 2 is constituted so that a light emitted from a semiconductor laser 24, as a light source, is introduced via a lens 25 and a polaroid beam splitter 23 into an object lens 20. The light is focused by the object lens 20 as a beam spot BS so as to project onto the optical disk 1, and a light reflected from the optical disk 1 is input via the object lens 20 by the polaroid beam splitter 23 into a 4-division light receiver 26. The optical head 2 may be referred to as a carriage 2.

In such an optical recording disk, tracks are formed with a pitch of several micrometers, typically 1.6 $\mu$m, in great numbers along a radial direction of the optical disk 1. Accordingly, even a little eccentricity, typically 100 $\mu$m peak to peak, may cause a large track-displacement for a narrow single track, and an undulation of the optical disk 1 causes a displacement of a focusing point of the beam spot as well. Therefore, it is necessary for the beam spot to be less than 1 $\mu$m to follow these displaced and/or undulated tracks.

For these purposes, there are provided a focus-actuator (focus coil) 22 for moving the object lens 20 on the optical head 2 along the axial direction of the lens so as to change the location of the focusing point, and a track actuator (tracking coil) 21 for moving the object lens 20 (i.e. along left and right directions in the figure) so as to change the location of the beam spot along the orthogonal (i.e. radial) direction of the tracks. There are also provided a focus servo controller 4 for generating a focusing error signal FES from the light signal of the light receiver 26 to drive the focus actuator 22, and a fine tracking servo controller 3 for generating a tracking error signal TES from the light signal of the light receiver 26 to drive the track actuator 21.

The principle of fine tracking control depends, as shown in FIGS. 1B and 1C, on the utilization of a diffraction phenomena of the beam spot BS caused by a coaxial or spiral guide groove (track) 10 provided in advance on the optical disk 1. In other words, the fact that distribution of the amount of the reflected light into the light receiver 26 is varied by the light diffraction at the track 10 depending on the relative position of the beam spot BS to the track 10, is utilized in order to acquire the beam spot's position error from the track 10. For example, when a push-pull method having a four-division light receiver which consists of four photo diodes 26*a*, 26*b*, 26*c* and 26*d* is employed as it is conventionally used, the reflected light distributions at the light receiver 26 are such that: for the case where the location of the beam spot $P_1$ is deviating toward left hand side of the track 10 as shown in FIG. 1C, the distribution is as shown in FIG. ID; for the case where the beam spot $P_1$ is not deviating from the track 10 (i.e. on track), the distribution is as shown in FIG. 1E; and for the case where the location of the beam spot $P_2$ is deviating toward right hand side of the figure from the track 10, the distribution is as shown in FIG. 1F. Therefore, {(a+b)−(c+d)} obtained in the fine tracking servo controller 3 from the outputs a–d of the photo diodes 26*a*–26*d* forms a tracking error signal TES shown in FIG. 1G, which then drives the tracking actuator 21, which accordingly drives the object lens 20 toward left and right directions. Thus, the beam spot can be controlled to trace the track 10 regardless of the eccentricity and undulation of the optical disk 1.

For the beam spot to cross many of the tracks to access a particular track (referred to hereinafter as track jumping), two basic methods have been employed. The first one of the methods is to move the beam spot by moving the optical head (a carriage) 2, on which there are installed the lens 20 or a galvano mirror (not shown in the figure) thereon, along the orthogonal directions of the tracks for a long stroke, such as 120 mm. The second method is to move the beam spot with a fine tracking mechanism, which is originally provided for the beam spot to trace a track by moving the lens 20 or the mirror (representatively referred to hereinafter as lens) on a carriage along orthogonal directions of the tracks in order to compensate an eccentric movement of the track, while the carriage is fixed or following the lens by a lens position servo control (details of which will be described later), for the case where the number of track jumping is less than one hundred, for example. These two methods are used generally in combination. The number of tracks the beam spot is crossing is acquired by counting zero cross transitions in a zero cross signal TZCS which is generated from a tracking error signal which is originally provided for the fine tracking servo control of the lens.

As previously mentioned, the optical disk, and therefore each track, rotates undesirably eccentrically as much as 100 $\mu$m peak to peak, typically having a frequency of 30 Hz for 1800 revolutions per minute. The amount 100 $\mu$m corresponds to about 60 tracks having a pitch of 1.6 $\mu$m. Accordingly, in the first method an erroneous zero cross signal is generated when the radial speed of an eccentric track exceeds the beam spot's radial speed, resulting in an error in the counting of the number of track crossings. To determine the location of the beam spot after generation of an error in the counting of the number of track crossings, an ID (identification) number recorded in each track has to be read out after the track jumping is finished, and then according to the read out track ID number, the beam spot location must be adjusted by moving the lens to reach the destination track. Consequently, track jumping takes a long time.

In the second method, the counting of the crossed tracks is correct if the track crossing is done track by track. In this track-by-track jump method, a track actuator 21 drives the object lens 20 to move the beam spot BS from a present track 10*a* to a destination track 10*d* as shown in FIGS. 2A and 2B. A single-track jumping is repeated until the destination track is reached. Each track jumping involves a sequence in which an acceleration current $i_a$ is applied to the track actuator for an acceleration and next a deceleration current $-i_a$ is applied for a deceleration to stop. In each single track jumping, the beam spot BS can not trace the track quickly and stably after the single track jump is carried out because a settling period is required to allow the beam spot to capture the track through adjustments provided by the fine servo (the beam spot is considered to have captured the track when tracking error signal TES becomes almost zero). It takes a relatively long period, such as 2.5 ms, for the beam spot to cross to an adjacent track and to stop at the centre of the track. Accordingly, the period required for jumping a great number of tracks becomes the multiplication of the 2.5 ms by number of tracks to be jumped. Such a long period can not satisfy the recent trend of fast accessing of the optical disk.

SUMMARY OF THE INVENTION

It is a general object of the invention to provide methods of a fast track jumping over a long distance, without stopping at each track, while the number of tracks the beam spot has crossed is accurately counted.

A track jumping of the present invention is carried out by the steps of: accelerating a fine tracking device on a carriage while enabling a position servo which moves the carriage so that the fine tracking device returns to its neutral position on the carriage, until the beam spot becomes faster than a radial speed of the eccentric tracks; further accelerating the carriage; decelerating the carriage until the beam spot speed becomes slow enough for the fine tracking device to seek a destination track; counting a number of zero crossings, each of which indicate that said beam spot crossed to an adjacent track, in the tracking error signal since the track jumping is initiated; and accelerating/decelerating the fine tracking device according to a difference of the counted number of crossed tracks and an instructed number of track jumping to reach a destination track.

Another method of the track jumping is carried out by the steps of: accelerating a carriage having a fine tracking device thereon while enabling the fine tracking servo to keep a start track at which the beam spot has been located when the track jumping is instructed, until the carriage speed becomes higher than a predetermined level; disabling the fine tracking servo and enabling a lock, by which the fine tracking device returns to a neutral position on the carriage, accordingly the beam spot is accelerated; further accelerating the carriage until the beam spot reaches a preprogrammed track; decelerating the carriage until the beam spot speed becomes slow enough for the fine tracking device to seek the destination track; counting a number of zero crossings, which indicate that the beam spot crossed to an adjacent track, in the tracking error signal since the track jumping is initiated; and accelerating/decelerating the fine tracking device on the carriage according to a difference of the counted number of crossed tracks and an instructed number of track jumps so as to reach a destination track.

Still another method of track jumping using a fine tracking device, applicable to the above-described two methods is carried out by the steps of: measuring each time interval for zero crossings, which indicate that the beam spot crosses to adjacent track, in the tracking error signal, while the beam spot is moving; obtaining a time difference between the time interval between the zero crossings and a predetermined time interval; and accelerating or decelerating the fine tracking device on the carriage according to the time difference, so as to make the time interval of said zero crossings essentially equal to the predetermined time interval, i.e. so that the beam spot is at a predetermined speed, without stopping the beam spot at each track which is to be crossed.

According to the methods of the present invention, the track that the beam spot has crossed is always accurately counted, while the beam spot is moving fast without stopping at each track; therefore, a quick and accurate track jumping is accomplished.

The above-mentioned features and advantages of the present invention, together with other objects and advantages, which will become apparent, will be more fully described hereinafter, with reference being made to the accompanying drawings which form a part hereof, wherein like numerals refer to like parts throughout.

DESCRIPTION OF THE PREFERRED EMBODIMENTS

Preferred embodiments of the present invention are hereinafter described referring to cases where a fine tracking device consists of a lens.

Figure 1A:
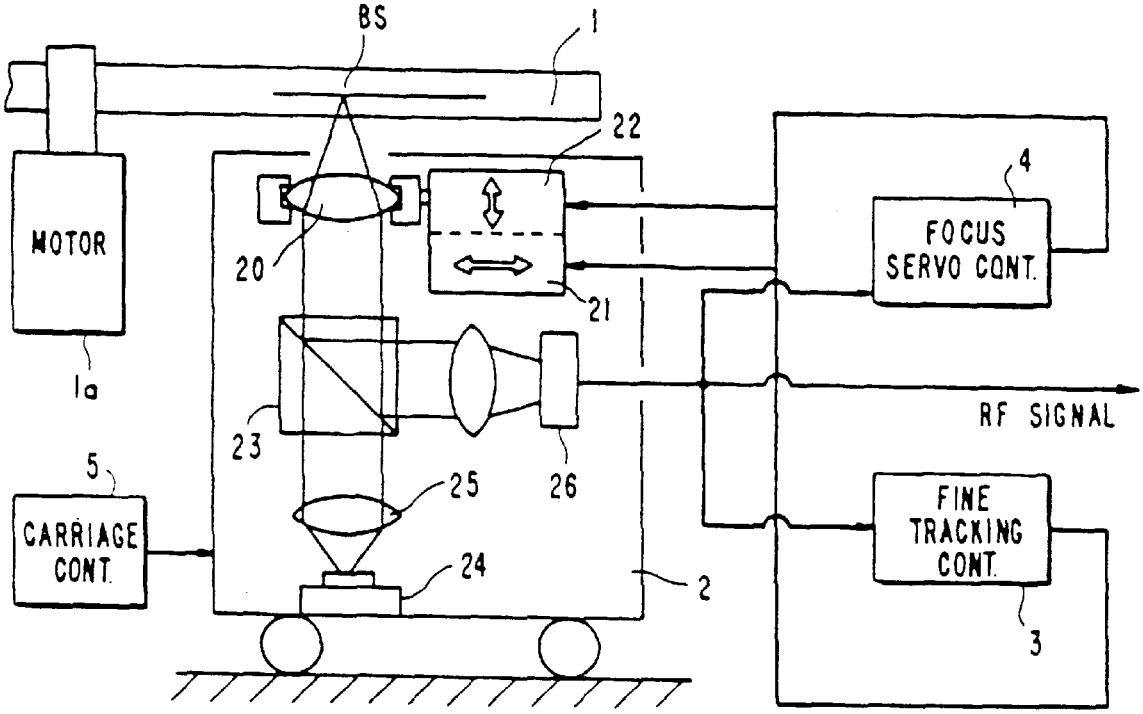
FIG. 1A is a schematic diagram of servo mechanisms in an optical recording disk apparatus.
Figure 1B:
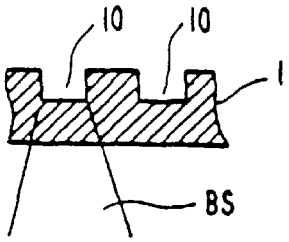
FIGS. 1B through 1G are diagrams for explaining the principle of fine tracking servo control.
Figure 1C:
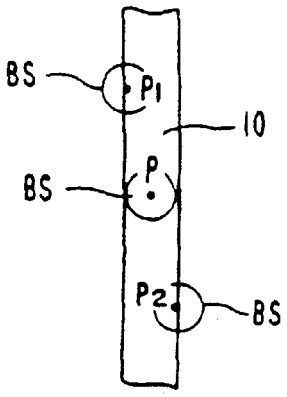
Figure 1D:
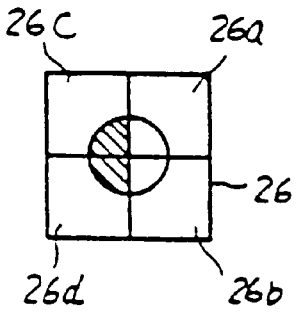
Figure 1E:
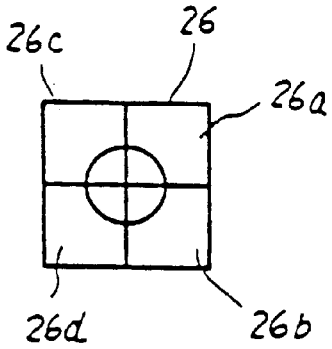
Figure 1F:
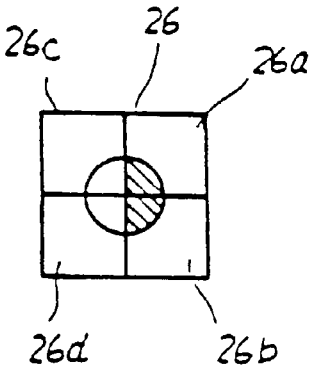
Figure 1G:
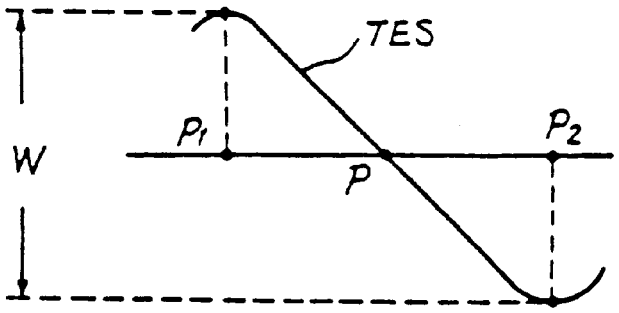
Figure 2A:
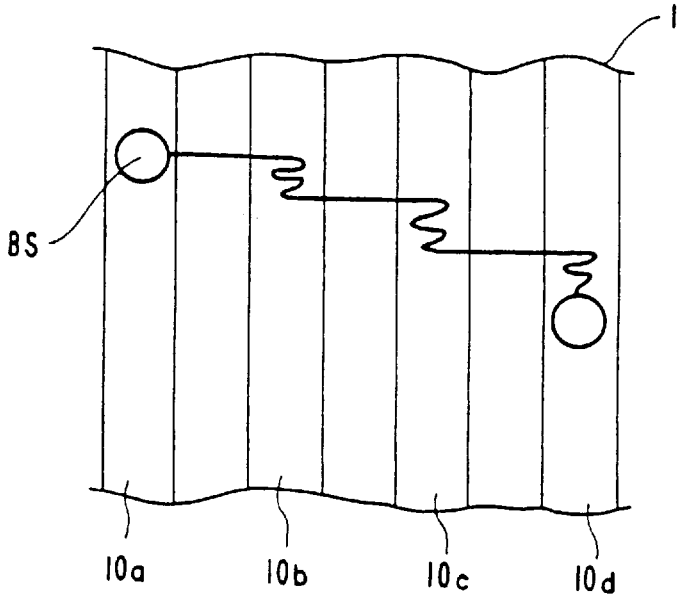
FIG. 2A PRIOR ART
FIGS. 2A and 2B are a diagram and a graph, respectively, for explaining a prior art track-by-track jumping method.
Figure 2B:
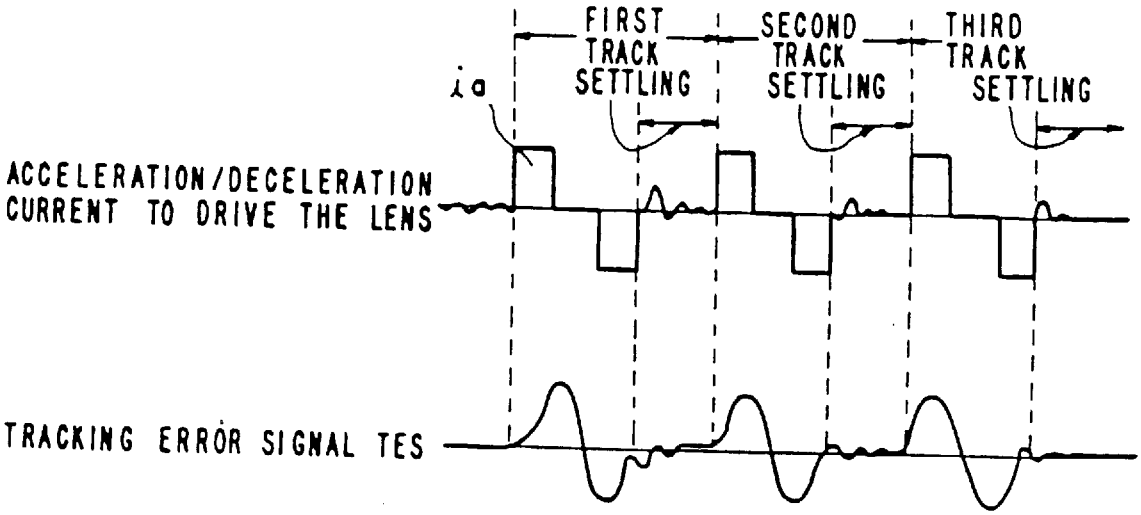
FIG. 2B PRIOR ART
Figure 3:
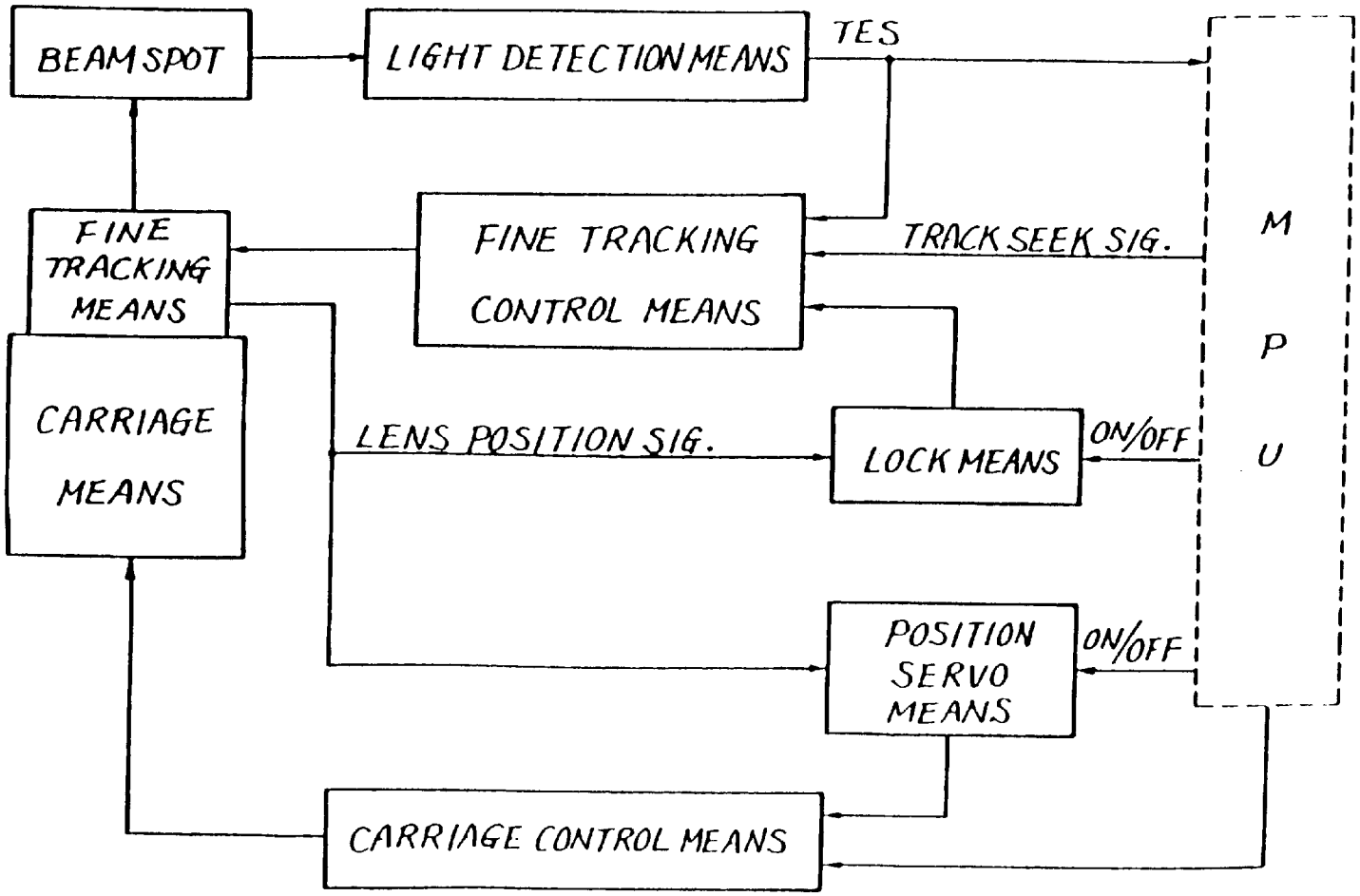
FIG. 3 is a block diagram of an optical disk apparatus used for the methods of the present invention.
Figure 4A:
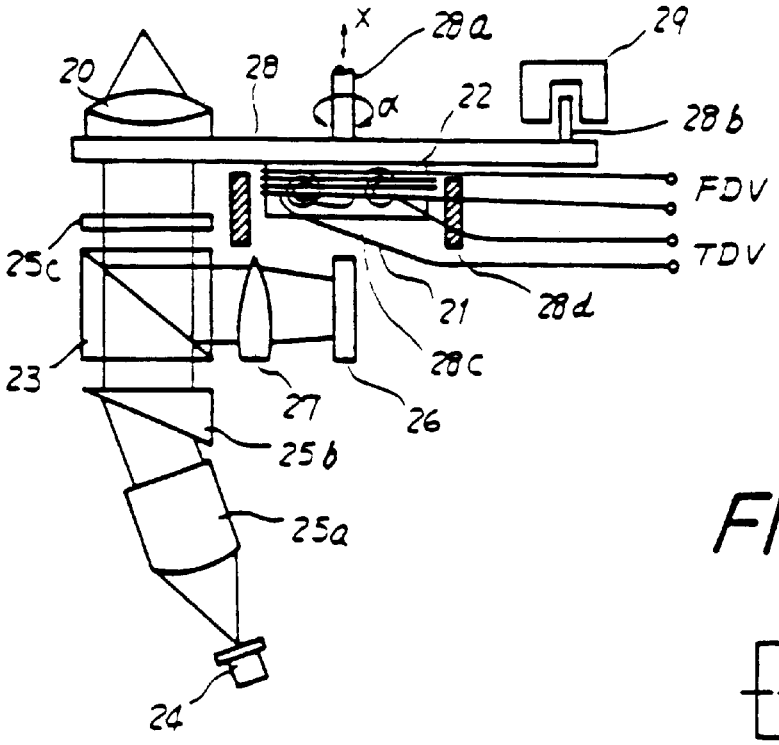
FIG. 4A is a schematic diagram of an optical head (carriage) used for the optical disk on which the methods of the present invention are applied.

First of all, the operation of an optical head, which is a carriage having the lens thereon, is explained. In FIG. 4A, a light generated in a semiconductor laser 24 is made a parallel light beam by a collimator lens 25*a*; the cross-section of the light beam is corrected to be a true round by a true-round correction prism 25*b*; the light beam is projected into a polarization beam splitter 23; further projected into an object lens 20 via a ¼ wavelength plate 25*c*; and focused as a beam spot BS on an optical disk 1 (FIG. 1A). A reflected light from the beam spot on the optical disk 1 is projected into the polarization beam splitter 23 via the object lens 20, the ¼ wavelength plate 25*c*; and then projected into a four division light receiver 26 via a focusing lens 27. The object lens 20 is installed on an end of the main body 28 of an actuator rotatable around an axle 28*a*, and a slit 28*b* is provided on the other end of the main body 28. The main body 28 is provided with a coil holder 28*c*; the coil holder 28*c* is provided with a focus coil 22 therearound; and with a spiral tracking coil 21 on its side; and a magnet 28*d* is provided surrounding the coil 28*c*.

Therefore, when a current is applied into the focus coil 22, the actuator 28 having the object lens 20 thereon moves along the lens's axis, i.e. up or down in the X direction on the figure, thus the focusing point of the lens can be varied; and when a current is applied into the actuator coil (the tracking coil) 21, the actuator 28 rotates around the axle 28*a* in the α direction, thus the position of the lens can be varied in a direction orthogonal to the tracks, i.e. the radial direction of the tracks.

Figure 4B:
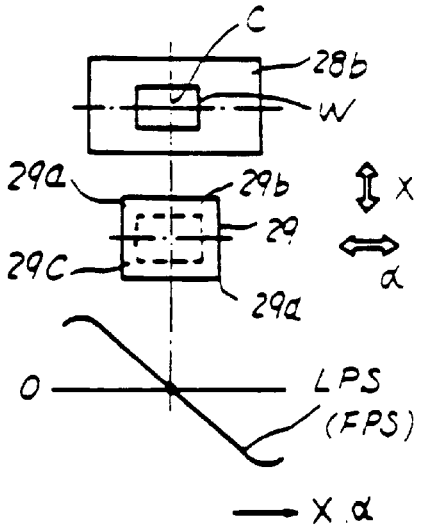
FIGS. 4B and 4C are diagrams of the structure for a lens lock and a lens position servo.
Figure 4C:
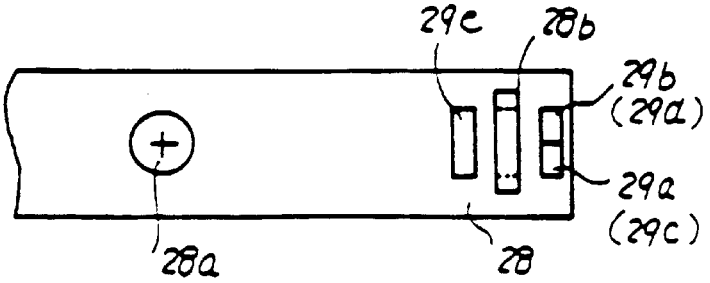

For the slit 28*b* on the other end of the actuator 28, there is provided a position sensor 29 on the carriage 2 of FIG. 1A (the lens head 2 is referred to hereinafter as carriage 2). The position sensor 29 is located so that a light emitter 29*e* and four-division light receiver 29 are facing and aligned with each other via the slit 28*b* as shown in FIGS. 4B and 4C. The slit 28*b* is provided with a window W, through which the light beam from the light emitter 29*e* is received by the four photo diodes 29*a*–29*d* of the light receiver 29. So, as shown in FIG. 4B, the received light distribution upon the photo diodes 29*a*–29*d* varies depending on the amount of the displacements along the α and X directions of the actuator 28. Therefore, a lens position signal LPS indicating the lens's displacement on the carriage 2 in the track's radial direction and a focus position signal for the focus direction FPS are acquired from the outputs A, B, C and D of each of the four photo diodes 29*a*–29*d* in a similar way to those of focusing and tracking servos, as follows:

$$LPS=(A+C)-(B+D)$$

$$FPS=(A+B)-(C+D)$$

These lens position signals LPS and FPS exhibit an S shape form for the displacements X and α from each essentially centre position, which is referred to hereinafter as a neutral position, of the stroke X and rotation α of the lens on the carriage. Each signal becomes zero at each neutral position, as shown in FIG. 4B. Thus, an electrical spring force returning the lens toward each neutral position can be generated from these signals. This function is referred to as a lens lock and a focus lock, and its original purposes are to prevent the lens from floating when the carriage is traveling and to prevent the lens from shifting too much from the centre of the coverage of the fine tracking servo.

The lens position signal LPS may also be negatively fed back to the carriage controller 6 to move the carriage so that the lens returns to its neutral position on the carriage. This may be referred to as a double servo control, a lens position servo control or simply a position servo control. The position servo control also prevents the range of the fine servo control from exceeding the allowable range of the lens of the carriage.

Next, referring to the circuit diagram in FIG. 5, details of the present invention are hereinafter explained. An operation controller, which is composed of a micro processor (referred to hereinafter as MPU) 7, which receives a track jump instruction from an upper processor (not shown in the figure) and stores an instructed number of tracks to jump D; and then transmits instructions to the tracking servo controller 3, the focus controller (not shown in FIG. 5) and the carriage controller 5 by running a program installed in MPU 7 in advance. MPU 7 also receives a track zero-cross signal TZCS from the zero cross detector 34*a* and an off-track signal TOS from an off-track detector 34*b* from which MPU 7 controls the beam spot location by the use of a lens forwarding signal FWR, a lens reversing signal RVS, and a lock-on signal LKS.

Figure 5:
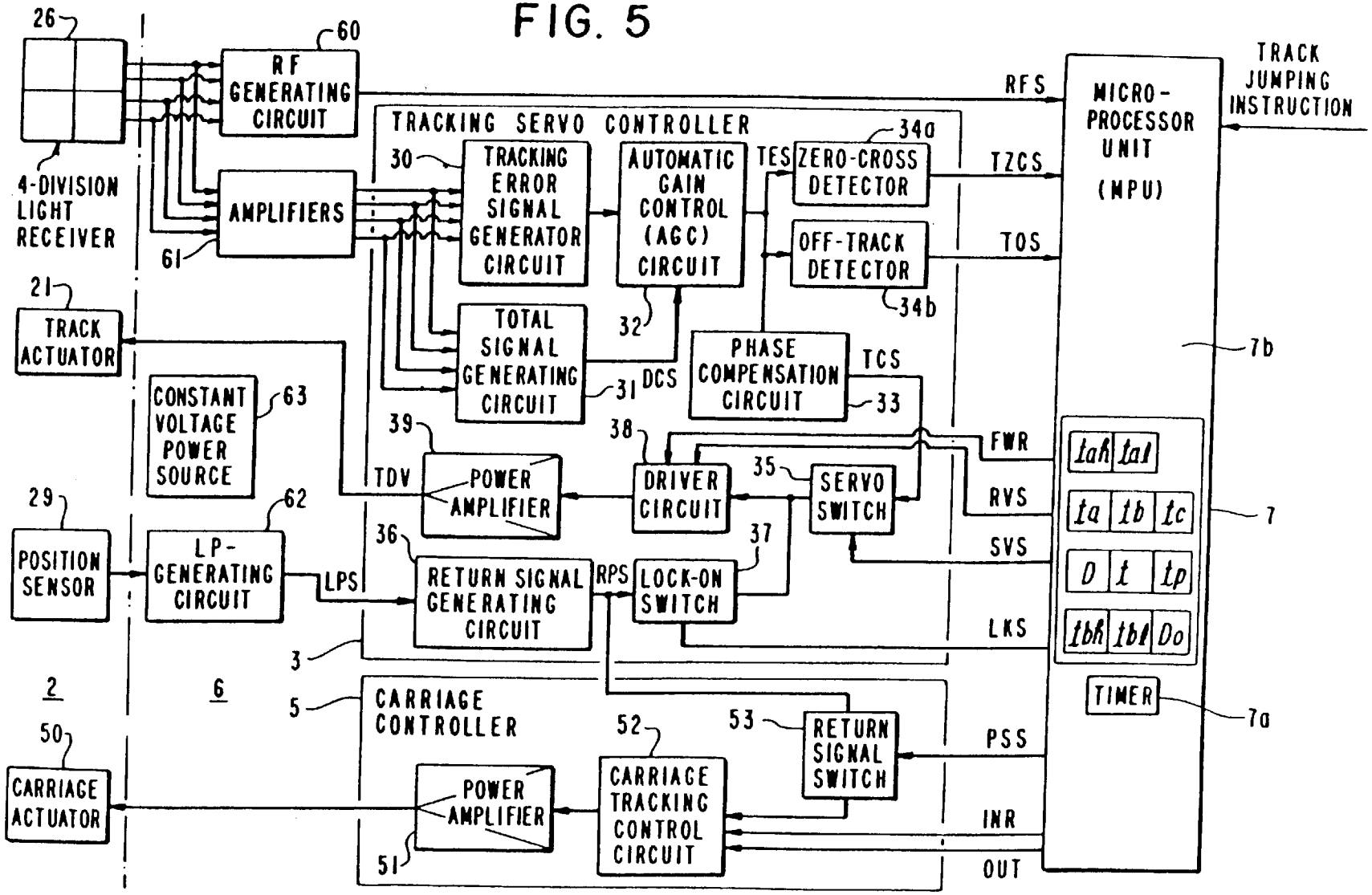
FIG. 5 is a block diagram of electrical circuits of the optical disk apparatus where the methods of the present invention are embodied.
Figure 6:
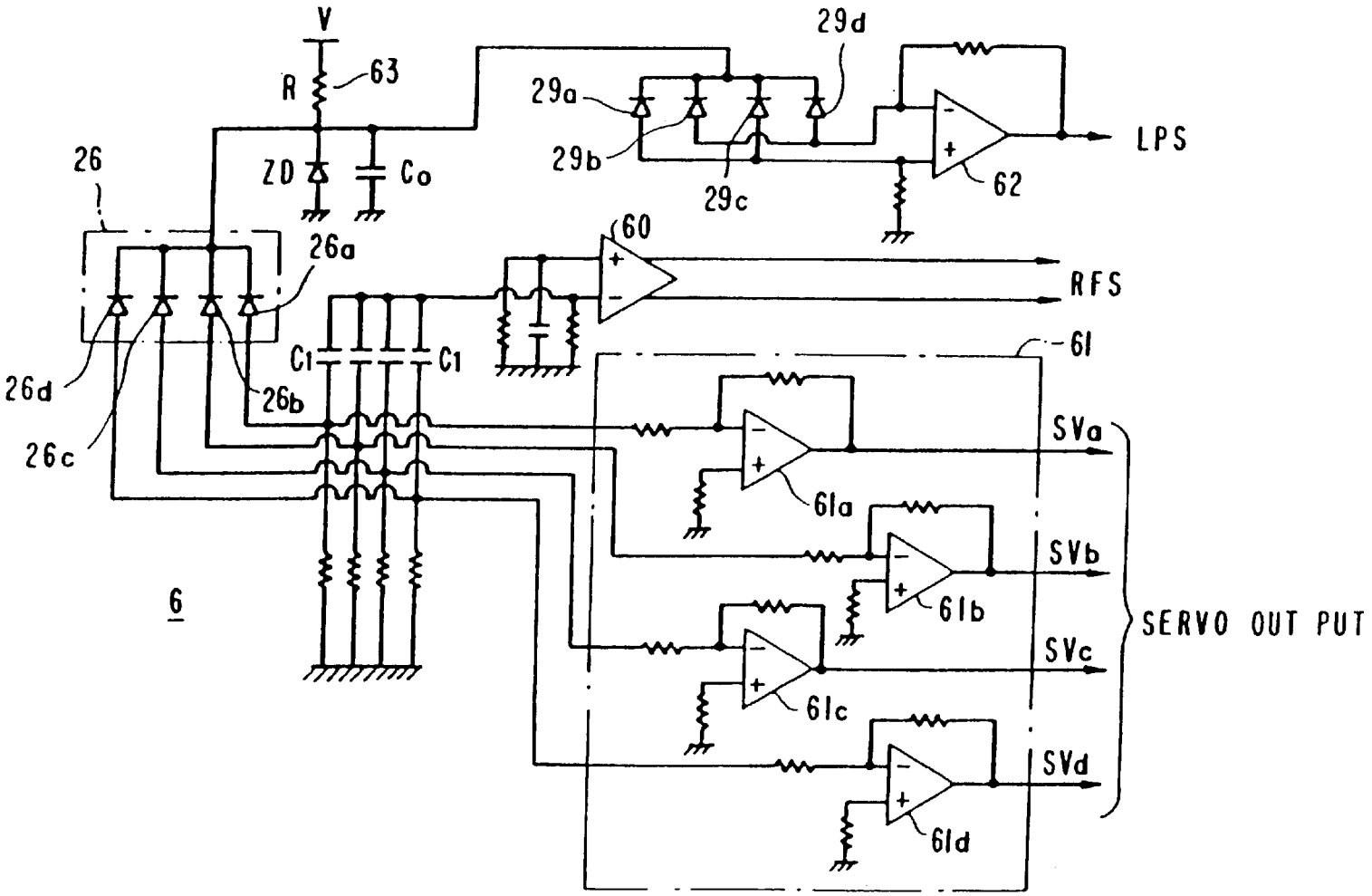
FIG. 6 is a detailed circuit diagram of head circuit 6 of the block diagram of FIG. 5.

A head circuit 6 of FIG. 5, as shown in detail in FIG. 6, includes an RF-composing circuit 60 for composing an RF signal RFS from the outputs a–d of the four-division light detector 26, an amplifier 61 for amplifying the outputs a–d of the four photo diodes 26*a*–26*d* so as to output servo outputs SVa–SVd, an LP-generating circuit 62 for generating the lens position signal LPS from the outputs A–D of the four photo diodes 29*a*–29*d* of the position sensor 29, the four-division light detector 26 and a constant voltage power source 63 for the position sensor 29 and the four-division light detector 26. In the head circuit 6, as shown in FIG. 6, the constant voltage power source 63 is composed of a zener diode ZD, a capacitor $C_0$, and a resistor R, and is connected to four photo diodes 26*a*–26*d* of the four-division light detector 26 as well as to the four photo diodes 29*a*–29*d* of the position sensor 29, and supplies a power source voltage V thereto. The LP-generating circuit 62 composed of a differential amplifier performs a differential amplification, i.e. (A+C)−(B+D), of the outputs A–D of the photo diodes 29*a*–29*d* so as to generate the lens position signal LPS; the RF-generating circuit 60 is composed of a high-pass filter, and adds the outputs of the four photo diodes 26*a*–26*d* via differentiator capacitors $C_1$ so as to be output to an operational amplifier 60. Furthermore, the amplifier 61 is composed of amplifiers 26*a*–26*d* connected respectively to the photo diodes 26*a*–26*d*. The amplifier 61 outputs servo outputs SVa–SVd.

Returning back to FIG. 5, a TES (tracking error signal) generating circuit 30 generates the tracking error signal TES from the servo outputs SVa–SVd of the amplifier 61 (61*a*–61*d*). A total-signal generating circuit 31 adds the servo outputs SVa–SVd so as to generate a total-signal DSC which indicates a total reflection level. An AGC (Automatic Gain Control) circuit 32 divides the tracking error signal TES by the total-signal (total reflection level) to perform the AGC in reference to the total reflection level, so that a variation of the projecting light intensity or the reflection coefficient is compensated. In a phase compensation circuit 33 the tracking error signal TES is differentiated and then added with a proportional component of the tracking error signal TES so as to advance the phase.

A zero-cross detector 34*a* detects a zero-cross transition of the tracking error signal TES so as to output the track zero-cross signal TZCS to MPU 7. An off-track detector 34*b* detects whether the tracking error signal TES becomes larger than a predetermined level Vo in a positive direction or lower than a predetermined level −Vo in a negative direction, i.e. becoming an off-track state, and then outputs an off-track signal TOS to MPU 7. A servo switch 35 closes a servo loop when the servo signal SVS is output from the MPU 7. The servo switch 35 also opens the servo loop when the servo signal SVS is disabled. A return signal generating circuit 36 generates, from the lens position signal LPS acquired from the LP-generating circuit 62, a return signal RPS which generates a return force on the actuator 28 toward the neutral position on the carriage as shown in FIG. 4B. A lock-on switch 37 is closed by the lock-on signal LKS from MPU 7 so as to introduce the return signal RPS to the servo loop, and opens by the disabling of the LKS signal so as to cut the introduction of the return signal to the servo loop. A driver circuit 38 generates a forward acceleration signal +V corresponding to the lens forwarding signal FWR, a backward deceleration signal −V corresponding to the lens reversing signal RVS, and an output of a sum of the outputs from the servo switch 35 and the lock-on switch 37. A power amplifier 39 amplifies an output of the driver circuit 38 so as to deliver a track driving current TDV to the track actuator coil 21.

Figure 7:
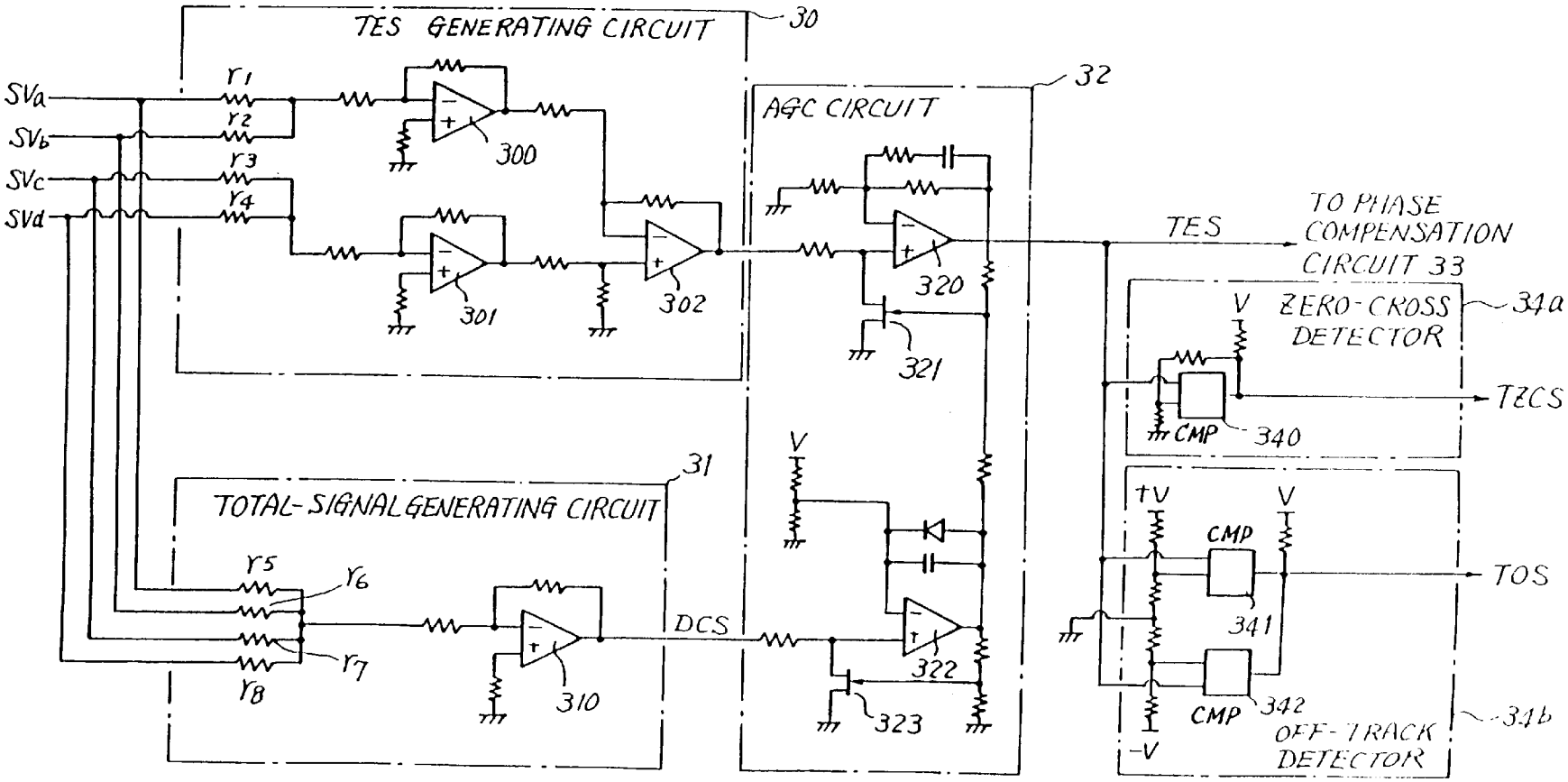
FIG. 7 is a detailed circuit diagram of the TES generating circuit 30, the total-signal generating circuit 31, the AGC circuit 32, the zero-cross detector circuit 34*a*, and the offtrack detector circuit 34*b* of the block diagram of FIG. 5.
Figure 8:
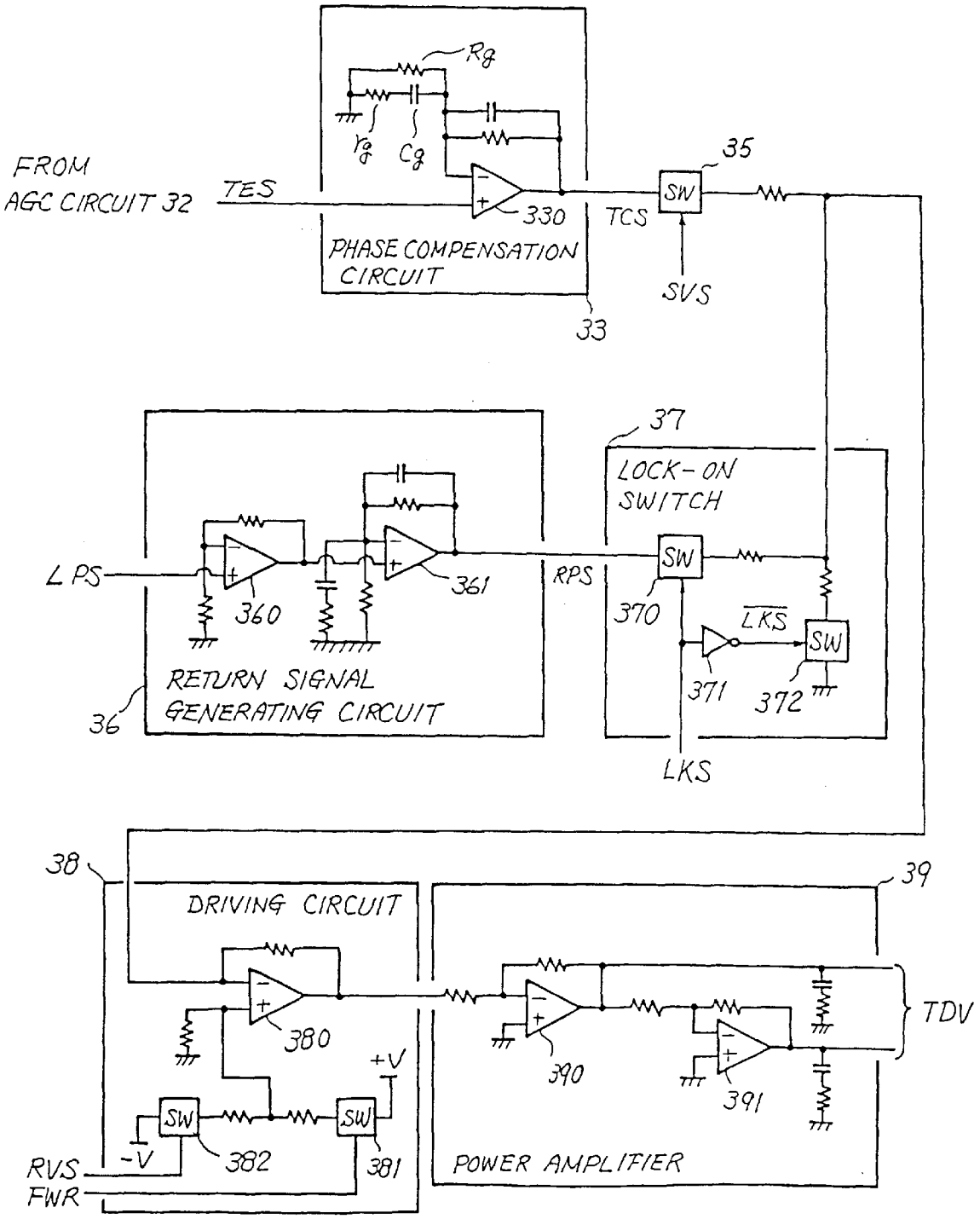
FIG. 8 is a detailed circuit diagram of the phase compensation circuit 33, the return signal generating circuit 36, the lock-on switch 37, the driver circuit 38, and the power amplifier 39 of the block diagram of FIG. 5.

Details of the tracking servo controller 3 of FIG. 5 are shown in FIG. 7 and FIG. 8. As shown in FIG. 7, the TES generating circuit 30 includes an adder amplifier 300 for adding other servo outputs SVa and SVb via input resistors $r_1$ and $r_2$, respectively, an adder amplifier 301 for adding the servo outputs SVc and SVd via input resistors $r_3$ and $r_4$, respectively, and an adder amplifier 302 for subtracting the output −(SVa+SVb) of the adder amplifier 300 from the output −(SVc+SVd) of the adder amplifier 301. The differential amplifier 302 then outputs the tracking error signal TES={(SVa−SVb)−(SVc+SVd)}. The total-signal generating circuit 31 includes an adder amplifier 310 for adding each servo output SVa–SVd via input resistors $r_5$–$r_8$, and outputs the total-reflection level signal DCS=(SVa+SVb+SVC+SVd).

The AGC circuit 32 includes an operational amplifier 320 for receiving the tracking error signal TES, a first FET (Field Effect Transistor) 321 for dividing and controlling the input to the first operational amplifier 320 according to the output of the operational amplifier 320, a second operational amplifier 322 for receiving the total-reflection level signal DCS for controlling FET 321, and a second FET 323 for voltage-dividing the input to the second operational amplifier 322. Thus, the first FET 321 is controlled by the total-reflection level signal DCS, which is an output of the operational amplifier 322, so as to control the gain of the operational amplifier 320. An AGC-controlled tracking error signal TES/DCS is then acquired for the output of the operational amplifier 320. The second FET 323 is provided in order to compensate the non-linearity of the first FET 321 so as to accomplish linear characteristics. The zero-cross detector 34*a* is composed of a comparator 340 for comparing the zero-cross potential with the tracking error signal TES from the AGC circuit 32, so as to output the track zero-cross signal TZCS.

The off-track detecting circuit 34*b* includes a first comparator 341 for comparing the tracking error signal TES with the predetermined level Vo and then outputting a "High" level output when TES>Vo, and a second comparator 342 for comparing the tracking error signal TES with the predetermined level (−Vo) and then outputting a "High" level output when TES<−Vo. The off-track detecting circuit 34*b* outputs a sum of the outputs from both the comparators 341 and 342 as the off-track signal TOS. The phase compensating circuit 33, in which a differentiation circuit composed of a resistor $r_g$ and a capacitor $C_g$ and a proportion circuit including a resistor $R_g$ are connected to an operational amplifier 330, outputs to the servo switch 35 a signal of a sum of the differentiation of the tracking error signal TES of the AGC circuit 32 and its proportion, i.e. a signal TCS which is a tracking error signal added with a phase-advancing component.

The return signal generating circuit 36 includes an operational amplifier 360 for amplifying the lens position signal LPS from the LP-generating circuit 62 and a phase compensating circuit 361 for phase-compensating the output of the operational amplifier 360. The resultant output from return signal generating circuit 36 is the return signal RPS. The lock-on switch 37 includes a first switch 370, which is closed when the lock-on signal LKS is output, for adding the return signal RPS to the signal TCS of the servo switch 35; and inverter circuit 371 for inverting the lock-on signal LKS; and a second switch 372 which becomes closed when the inverted lock-on signal $\overline{LKS}$ is output, i.e. the lock-on signal is disabled.

The driver circuit 38 includes an adder amplifier 380; and a first switch 381 which is enabled by the lens forwarding signal FWR to deliver the forward driving signal +V to the adder amplifier 380; and a second switch 382 which is enabled by the lens reversing signal RVS to deliver the backward driving signal −V to the adder amplifier 380. When the respective control signals FWR, RVS, SVS, and LKS allow, the driver circuit 38 outputs driving signals (voltages) +V, −V and a sum of the control signals TCS and RPS from the adder amplifier 380. In the summation of the signals TCS and RPS, the signal RPS is set weaker than the signal TCS. The power amplifier 39 amplifies the output of the driving circuit 38 by serial two-stage amplifiers 390 and 391 so as to apply a positive or negative track driving current TDV into the tracking actuator coil 21.

Operation of the above-described embodiment is hereinafter explained. First of all, the operation of the track access of the present invention is described in conjunction with FIG. 9. In the above-described embodiment, the lens is moved as the fine tracking means on the carriage 2. A track access sought by moving the fine tracking device, i.e. the lens 20 in this embodiment, on the carriage is referred to hereinafter as a lens seek. A track seek carried out by moving the carriage 2 is referred to hereinafter as a carriage seek.

At first, the carriage 2 is stationary relative to the disk. The range (a) in FIG. 9 corresponds to a lens seek acceleration, in which the beam spot, i.e. lens 20, is accelerated on the carriage from a start track, on which the beam spot is projected when the track jumping is instructed. During this range (a), the fine tracking servo control is disabled, while the lens position servo remains enabled. Driven by the fine tracking controller 3, the beam spot accelerates until the speed of the beam spot exceeds the maximum radial speed Vec of the eccentric tracks. The carriage follows the beam spot automatically by a signal output from the lens position servo so that the lens eventually returns to the neutral position on the carriage. The lens position signal which was once increased becomes close to zero. Now the speed of the beam spot by the lens seek is adequately faster than the radial speed of the eccentric tracks varying typically at 30 Hz. Accordingly, the number of the tracks the beam spot has crossed can be accurately counted from the track zero-cross signal TZCS. The range (b) of FIG. 9 occurs during the carriage seek range. In range (b), the beam spot acceleration is carried out by further accelerating the carriage until the beam spot reaches almost half of the number of tracks to jump. The range (c) of FIG. 9 also occurs during the carriage seek range. In range (c), a beam spot deceleration is carried out by decelerating the carriage until the beam spot speed becomes slower than a limit speed Vls, below which the lens seek deceleration is surely possible, but faster than the radial speed Vec of the eccentric tracks. During the ranges (b) and (c), the beam spot speed is faster than the radial speed Vec of the eccentric tracks; therefore, the number of the crossed tracks can be accurately counted. The range (d) corresponds to deceleration of the beam spot by the lens seek, in which the beam spot, i.e. lens 20 is decelerated on the carriage drive reverse-ward by the fine tracking controller 3, so that the beam spot reaches a destination track. Early in the range (d), the crossed number of the tracks can be accurately counted until the last track is reached because the beam spot speed is faster than the radial speed of the eccentric tracks.

Operation of the circuits where the present invention is embodied is described hereinafter in detail referring to the block diagram in FIG. 5, the flow chart in FIG. 10 and the timing chart in FIG. 11. The beam spot has been tracing a start track by the fine tracking servo control and the position servo control, and then is instructed to jump toward the inner direction of the disk; therefore, the inner direction is referred to hereinafter as a forward direction, and the outer direction as the reverse direction.

Figure 9:
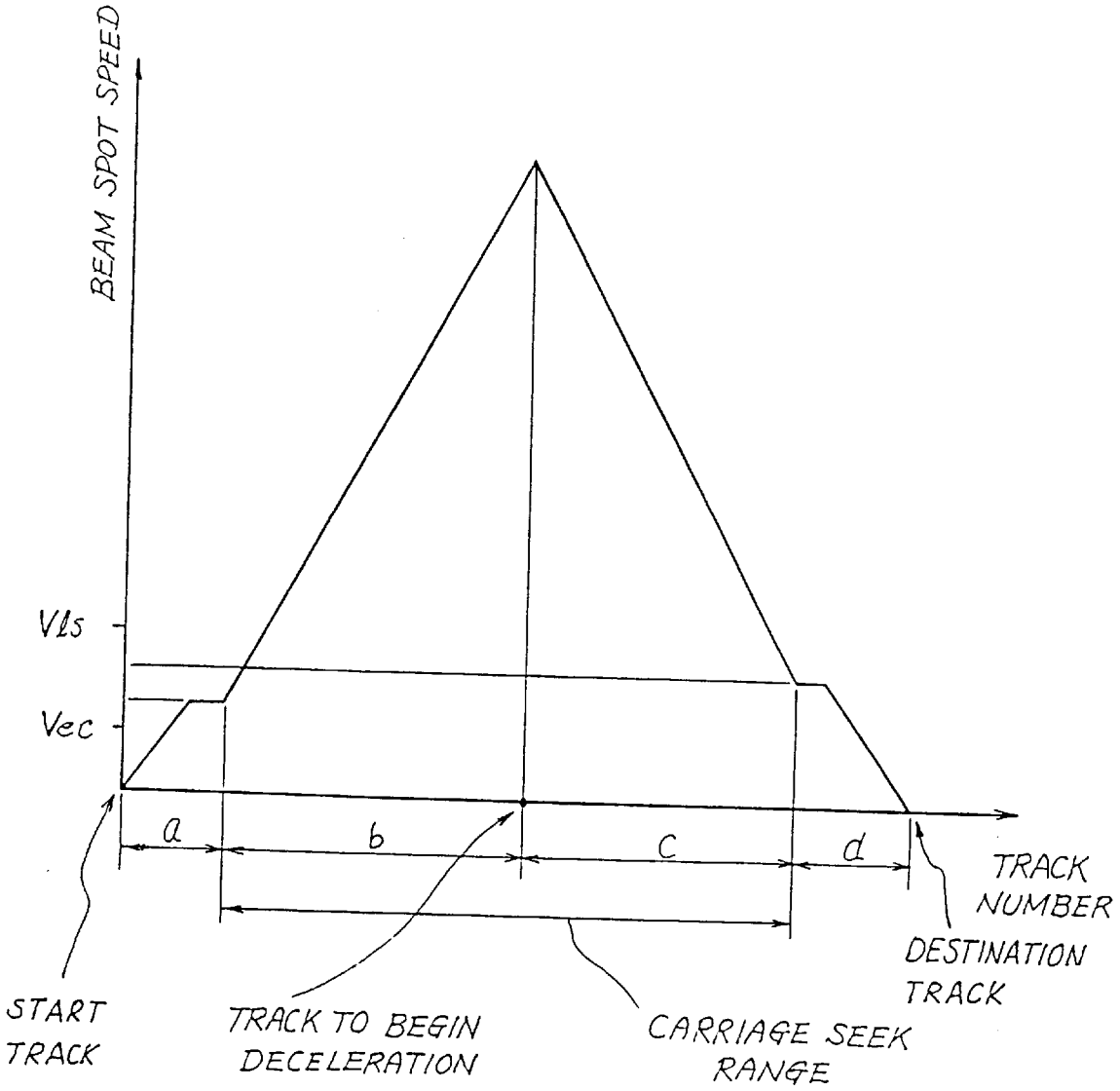
FIG. 9 is a graph explaining the principle of a track access method of the present invention.
Figure 10:
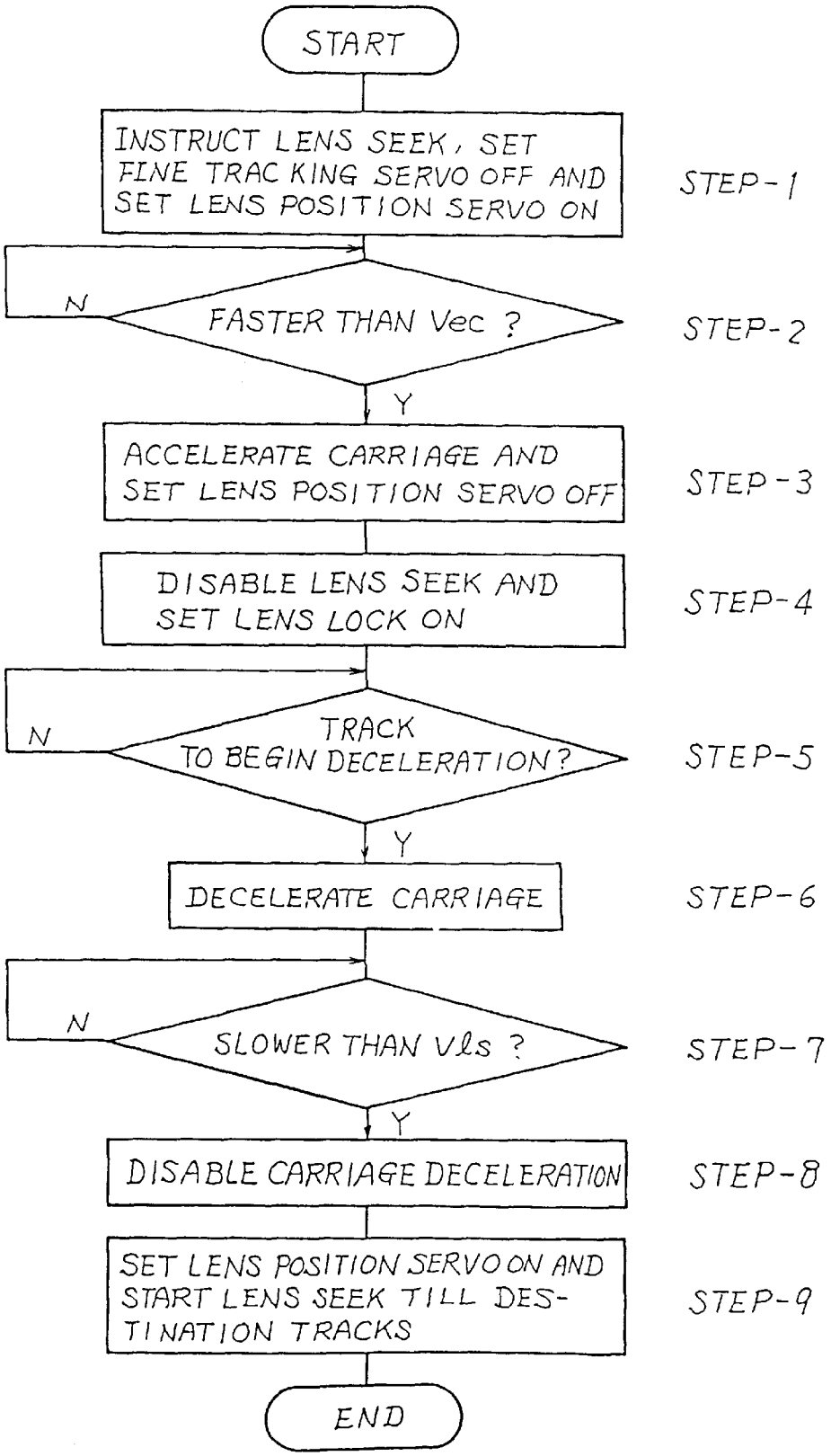
FIG. 10 is a flow chart of a preferred embodiment of the present invention of FIG. 9.
Figure 11:
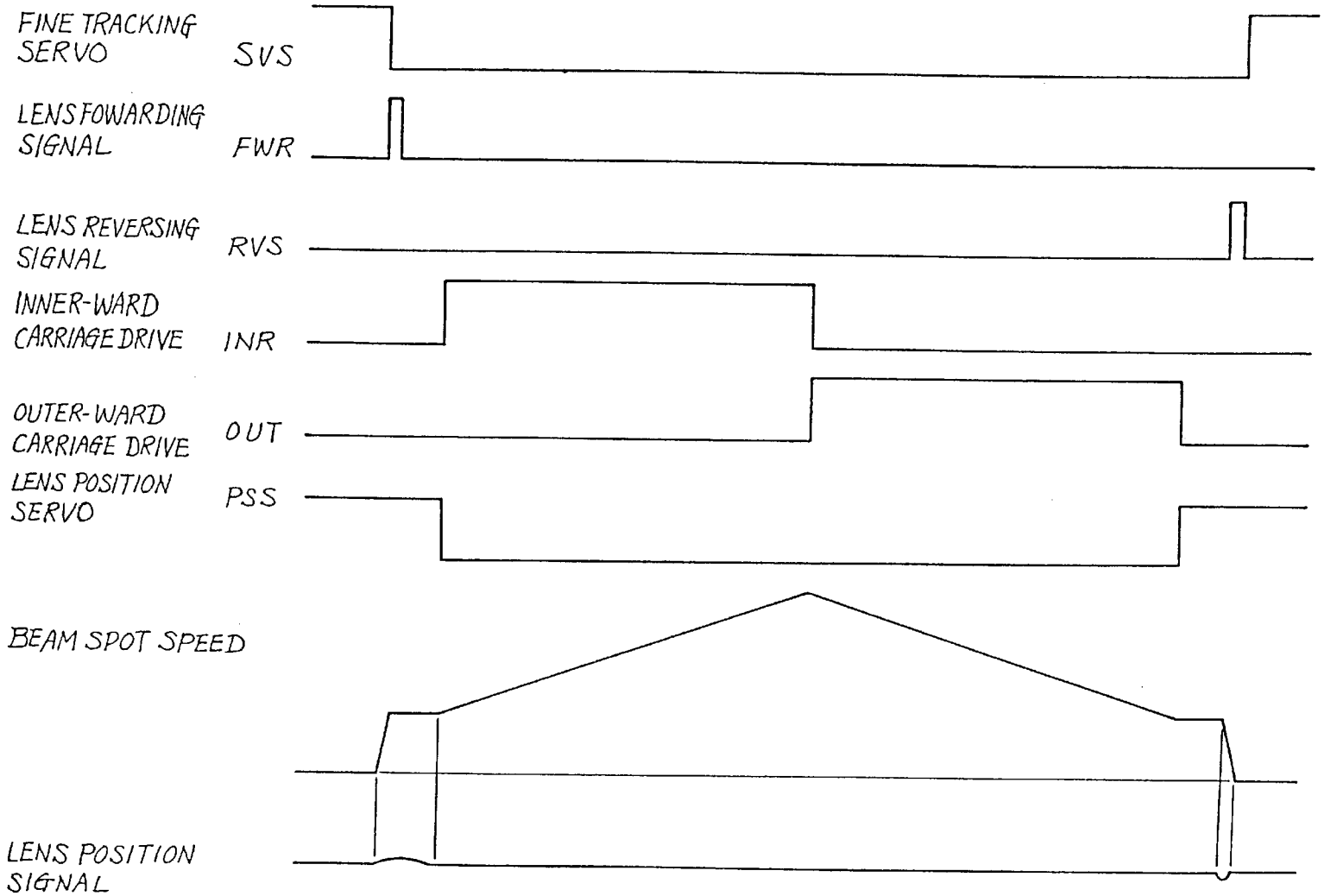
FIG. 11 is a timing chart of a preferred embodiment of the present invention of FIGS. 9 and 10.

In FIG. 10, in the step (1) the fine tracking servo is disabled, the lens position servo remains enabled, and a lens seek acceleration corresponding to the range (a) in FIG. 9 is initiated by disabling the lens reversing signal RVS, which moves the beam spot reverse-ward, i.e. outer-ward, and enabling the lens forwarding signal FWR, which moves the beam spot inner-ward, to be input to the lens driving circuit 38 so that the lens 20 is accelerated on the carriage 2 toward the inner direction. Owing to the lens position servo, the carriage 2 automatically moves to follow the beam spot. The amount of acceleration/deceleration may be controlled by the duration of the signal FWR or RVS, according to the beam spot speed measured from the interval of track zero-cross signal TZCS. In the lens seek, the beam spot speed easily becomes faster than the radial speed of the eccentric tracks because the lens system movable on the carriage is originally designed to be light enough to move fast for the fine tracking control.

There is a track-by-track speed control method, as one of the preferable methods of the lens seek. In this method, the beam spot speed crossing each track is watched and controlled, i.e. accelerated or decelerated, by the measurement of the interval of track zero-cross signal TZCS, so that the beam spot travels at an essentially constant speed without stopping at each track. Details of this method will be described later.

At the end of the step (1) of FIG. 10, i.e. at the end of the range (a) of FIG. 9, the lens position signal is approximately zero, i.e. the lens 20 is approximately at the neutral position on the carriage 2.

In the step (2) of FIG. 10, the beam spot speed is discriminated to determine whether the beam shot speed is adequately higher than the radial speed of the eccentric tracks. This discrimination is carried out by MPU 7 which judges whether the beam spot speed exceeds the maximum radial speed Vec of the eccentric tracks according to the time interval of the track zero-cross signal TZCS when the beam spot crosses a single track. If the beam spot speed is greater than the radial speed of the eccentric tracks, the step (3) is executed, but if the beam spot speed is less than or equal to the radial speed of the eccentric tracks, the step (2) is repeated.

In step (3) of FIG. 10, the carriage seek corresponding to the range (b) of FIG. 9 is initiated by the disabling of the lens position servo control and by applying a signal INR, which accelerates the carriage toward the inner direction of the disk, to the carriage tracking control circuit 52. During this step, the lens position servo control is disabled by disabling the lens position servo switch signal PSS, and the lens lock is enabled by outputting the lens lock-on signal LKS.

In step (4) of FIG. 10, which is carried out concurrently with the step (3), the lens seek is discontinued by enabling the lens lock. In step (5) of FIG. 10, discrimination determines whether the beam spot has reached, by the carriage seek of the range (b) of FIG. 9, a track where the carriage deceleration is to be started. Typically, the track where the carriage deceleration is to be started is chosen at approximately half of or a little less than half of the number of tracks to jump for the case where the acceleration speed or the deceleration speed, i.e. the acceleration or deceleration, is of the same degree. However, when the conditions, such as friction, etc., vary, the optimum location of the track where the carriage is to be decelerated varies from half of the track jump number. Accordingly, the track where the carriage deceleration is to begin may be calculated by a program installed in MPU 7 in advance. If the result of the discrimination is NO, step (5) is repeated.

In step (6) of FIG. 10, when the result of the discrimination in the step (5) is YES, the carriage 2 is decelerated, as shown in the range (c) of FIG. 9 of the carriage seek, by disabling the signal INR and applying the signal OUT, which decelerates the carriage toward the outer direction, to the carriage tracking controller 5.

In the step (7) of FIG. 10, discrimination determines whether the beam spot speed has reached a predetermined speed which is slower than the limit speed Vls but faster than the maximum radial speed Vec of the eccentric tracks. If the result of the discrimination is NO, the step (7) is repeated.

In the step (8) of FIG. 10, when the discrimination in the step (7) is YES, the carriage seek deceleration is discontinued by disabling the signal OUT.

In the step (9) of FIG. 10, the lens seek deceleration is started, as shown in the range (d) of FIG. 9, by the disabling of the lens lock-on signal LKS and outputting the lens position servo signal PSS. During this lens seek, the beam spot is decelerated by applying the lens reversing signal RVS to the lens driving circuit 38 so that the lens moves on the carriage toward the reverse direction of the track jumping, i.e. outward. Because of a signal output from the lens position servo, the carriage is automatically decelerated to follow the beam spot according to the lens position signal generated by this lens seek. During the lens seek, the number of the tracks the beam spot has crossed is accurately counted from the track zero-cross signal TZCS. If the beam spot speed at the beginning of this lens seek deceleration is slow enough from the lens to be able to stop at a destination track, the beam spot is kept moving at the constant speed until the beam spot reaches a predetermined track, typically one track prior to the destination track. Actually, deceleration occurs a half track prior to the destination track for a deceleration period tc as explained later in FIG. 15. Then, the lens is decelerated as mentioned above by the lens reversing signal RVS to stop at the destination track. If the beam spot speed at the beginning of this lens seek is not slow enough for the lens to be able to surely stop at a destination track, the beam spot is decelerated by decelerating the lens by the lens reversing signal RVS gradually or step by step until the beam spot speed becomes slow enough for the lens to stop at a destination track. Preferably, the track-by-track speed control is employed to the lens seek of the range (d) of FIG. 9 as well.

Though in the description of this preferred embodiment the lens position servo is enabled in step (9) of FIG. 10, this is not an absolute requirement to achieve the lens seek deceleration for the range (d) of FIG. 9, because the carriage can be stopped by other means, for example by the signal OUT, than this lens position servo.

Though in the description of this preferred embodiment the lens lock is disabled in steps (1) and (9) of FIG. 10, disabling the lens lock is not an absolute condition for the respective steps to achieve the operation of the invention. This is because the lens lock as well as the lens position servo can be overridden by the stronger lens seek signal; accordingly, the lens lock or the lens position servo may be continuously enabled for the start of the track jumping operation through all of the steps of FIG. 10, including a case where a spring or a rubber damper is employed as the lens lock means, so that there is no way to disable the lens lock.

A second preferred embodiment of the present invention is hereinafter described by referring to a flow chart in FIG. 12. The beam spot has been tracing a start track by the fine tracking servo control and the position servo control, and then is instructed to jump toward the inner direction of the disk. In step (1) of FIG. 12, when the track jump is instructed, the carriage is accelerated by the output of the signal INR of the instructed direction and by the disabling of the lens position servo and the lens lock while the fine tracking servo is kept enabled for the beam spot to maintain its position at the start track at which the track jump is initiated. As a result, the lens position signal is increased. In step (2), discrimination determines whether the lens position signal, which now corresponds to the distance travelled by the carriage, adequately exceeds a predetermined amount of the radial displacement of the eccentric tracks. This predetermined amount is chosen much larger than the maximum radial displacement of the eccentric tracks. When the carriage has traveled this predetermined amount, the carriage speed will be larger than the maximum radial speed Vec of the eccentric tracks. If the result of the discrimination is NO, step (2) is repeated. In step (3) of FIG. 12, when the result of the discrimination in step (2) is YES, the fine tracking servo is disabled and the lens lock is enabled. Accordingly, the lens lock force returns the lens to the neutral position on the carriage, causing the beam spot to move. At this time, the bear spot speed is high enough to accurately count the number of tracks the beam spot has crossed, eliminating the effect of the eccentric track rotation. In step (4) of FIG. 12, the carriage acceleration is continued while the lens lock remains enabled.

Figure 12:
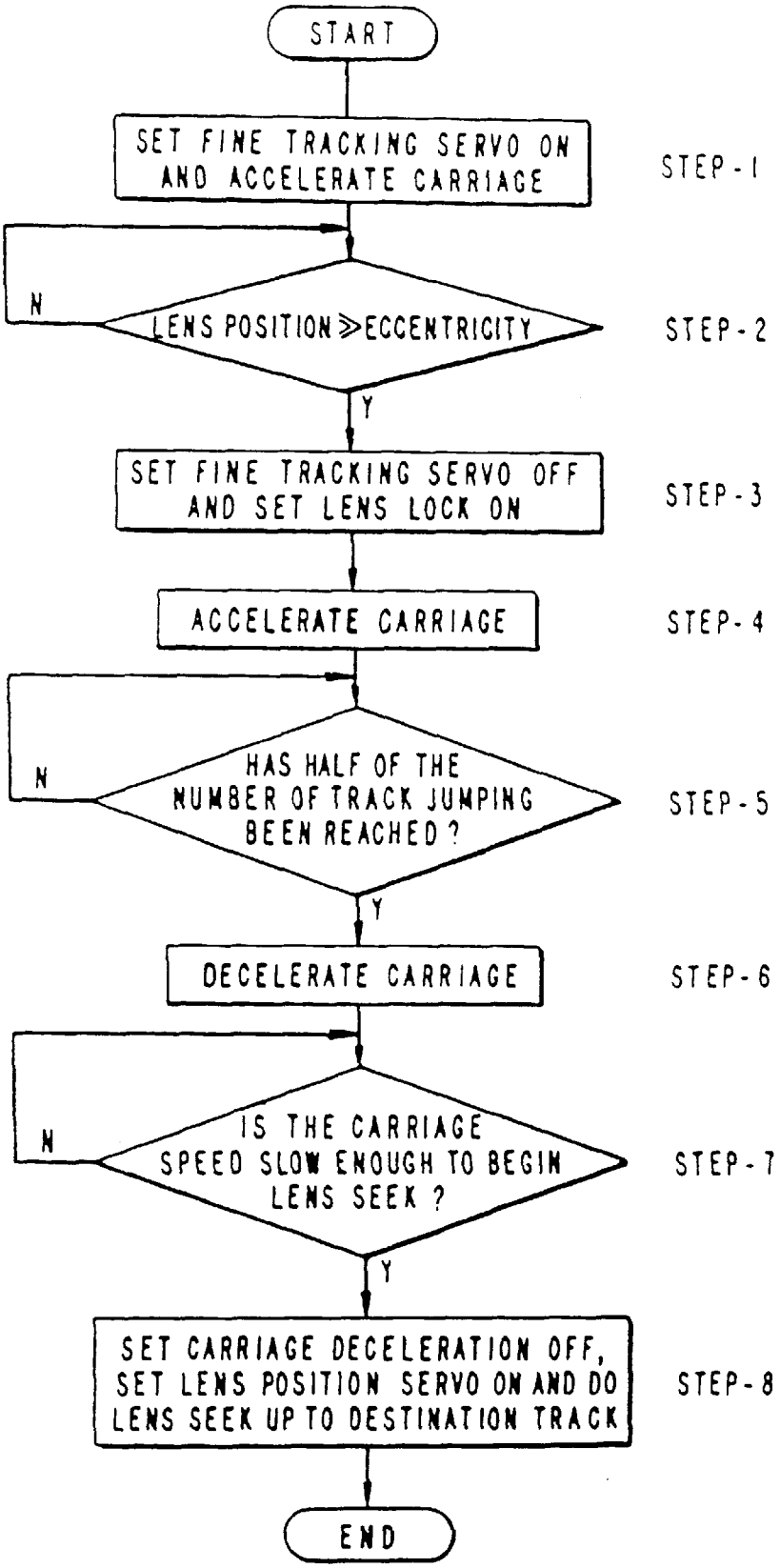
FIG. 12 is a flow chart of a second preferred embodiment of the present invention of FIG. 9.

In step (5) of FIG. 12, discrimination determines whether the beam spot has reached a track where the carriage deceleration is to be started. Typically, the track where the carriage deceleration is to be started is chosen at approximately half of the number of tracks to be jumped for the case where the acceleration speed or the deceleration speed, i.e. the acceleration or deceleration, is of the same degree. However, when conditions, such as friction, etc. of the apparatus, are different, the optimum location of the track where the carriage deceleration is to be started varies from half of the track jump number. Accordingly, the track where the carriage deceleration is to begin may be calculated by a program installed in the MPU 7 in advance. If the result of the discrimination is NO, step (5) is repeated.

In step (6) when the result of the discrimination in the step (5) is YES, the carriage 2 is decelerated by disabling the signal INR and by enabling the output of the signal OUT to the carriage tracking controller 2, in the same manner as step (6) of FIG. 10 for the range (c) of FIG. 9 of the carriage seek of the first preferred embodiment. In step (7) of FIG. 12, the beam spot speed is discriminated in the same way as step (7) of the first preferred embodiment. If the result of the discrimination is NO, step (7) of FIG. 12 is repeated.

In step (8) of FIG. 12, when the result of the discrimination in step (7) is YES, the carriage seek is discontinued by the disabling of the signal OUT. The lens seek deceleration is started in the same way as the range (d) of FIG. 9 of the previous embodiment, by the disabling of the lens lock-on signal LKS and preferably by enabling the lens position servo. During this lens seek deceleration, the beam spot is decelerated by applying the lens reversing signal RVS to the lens driving circuit 38 so that the lens moves on the carriage toward the reverse direction of the track jumping, i.e. outward in this case. Because of a signal generated by the lens position servo, the carriage is automatically decelerated to follow the beam spot according to the lens position signal generated by the lens seek. During the lens seek deceleration before the destination track is reached, the number of the tracks the beam spot has crossed is accurately counted from the track zero-cross signal TZCS. If the beam spot speed at the beginning of this lens seek is slow enough for the lens to be able to stop at a destination track, the beam spot is kept moving at the constant speed until the beam spot reaches a predetermined track, typically one track prior to the destination track. Then, the lens is decelerated to stop at the destination track. If the beam spot speed at the beginning of this lens seek deceleration is not slow enough for the lens to be able to stop with certainty at a destination track, the beam spot is decelerated by decelerating the lens gradually or step by step until the beam spot speed becomes slow enough for the lens to stop at a destination track. Preferably, track-by-track speed control can be employed to this lens seek as well.

Though in the description of the second preferred embodiment the lens position servo and the lens lock are disabled in step (1) of FIG. 12, and the lens lock is enabled in step (3) of FIG. 12, whether the lens position servo or the lens lock is enabled or disabled is not an absolute condition, but rather a preference, for the respective step to achieve the operation of the invention. This is because the lens position servo as well as the lens lock is designed weaker than the fine tracking servo. Accordingly, they may be continuously kept enabled from the start of the track jumping operation through all of the steps of FIG. 12, including a case where a spring or a rubber damper is employed as the lens lock means and there is no way to disable the lens lock.

A preferred embodiment of the track-by-track speed control method preferably referred to as a method of the lens seek in the above-described two embodiments is hereinafter explained, referring to a principle diagram in FIGS. 13A and 13B, a circuit block diagram in FIG. 5, a flow chart in FIGS. 14A, 14B, and 14C and a timing chart in FIGS. 15A and 15B, where a cycle of an acceleration from a start track, a constant speed travel over a plurality of tracks, and an arrival at a destination track is described as an example. This method is used while the carriage is stationarily fixed or following the beam spot by means of the lens position servo control.

The circuit structure for this method is essentially the same as that used for the above-described two embodiments in FIG. 5. MPU 7 further includes a timer 7*a* and in the memory 7*b* there are stored: a predetermined acceleration period ta; a target period tb for a single track crossing corresponding to a target speed; a predetermined deceleration period tc; a number D of tracks to jump; a number $D_0$ of tracks for which the target speed is switched; an acceleration/deceleration control pulse time t for the track-by-track speed control; a processing time tp; a high speed target time tbh which corresponds to a high target speed; a low speed target time tbl which corresponds to a low target speed.

Figure 13A:
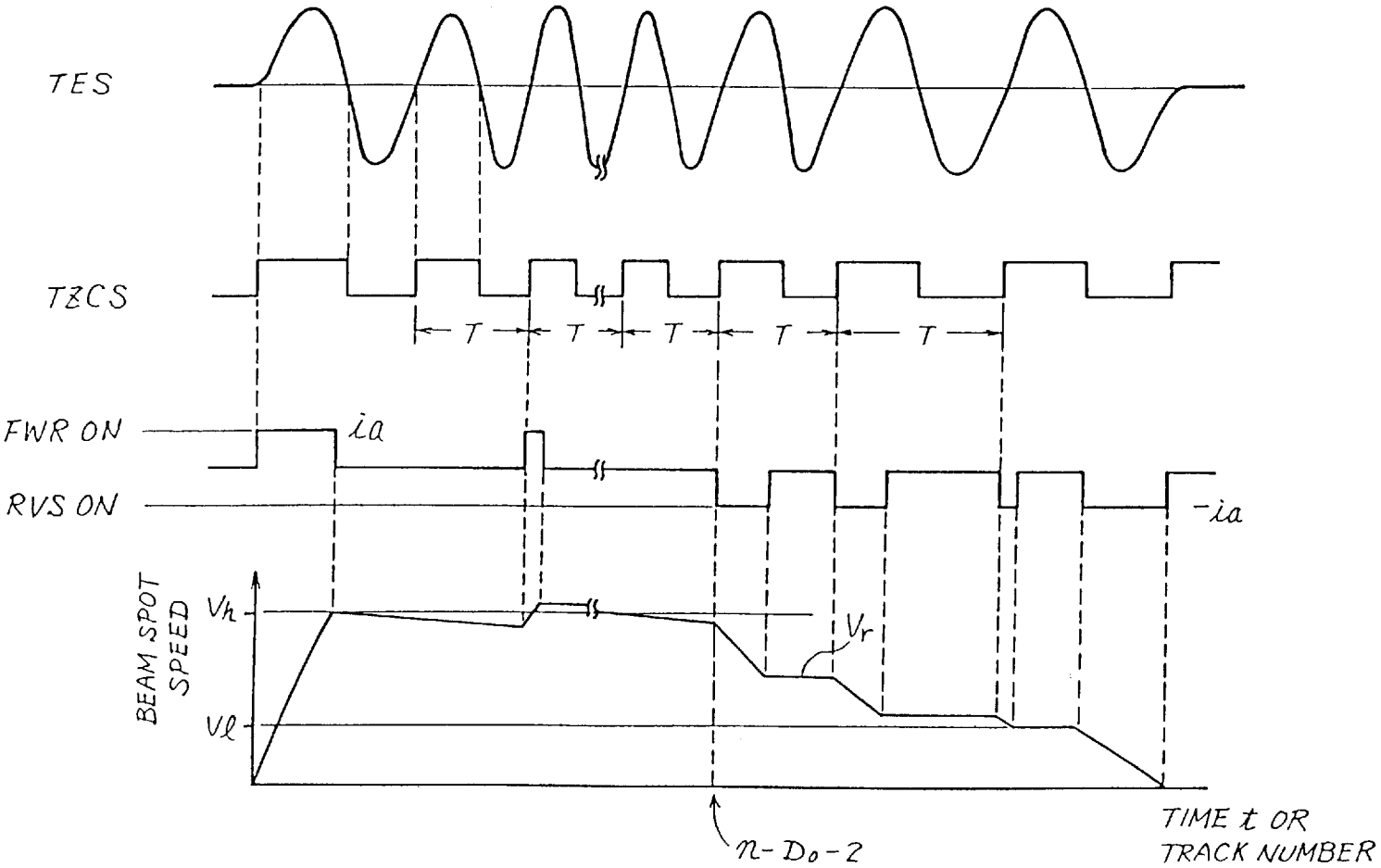
FIGS. 13A and 13B are timing diagrams of a track-by-track speed control method of the present invention.
Figure 13B:
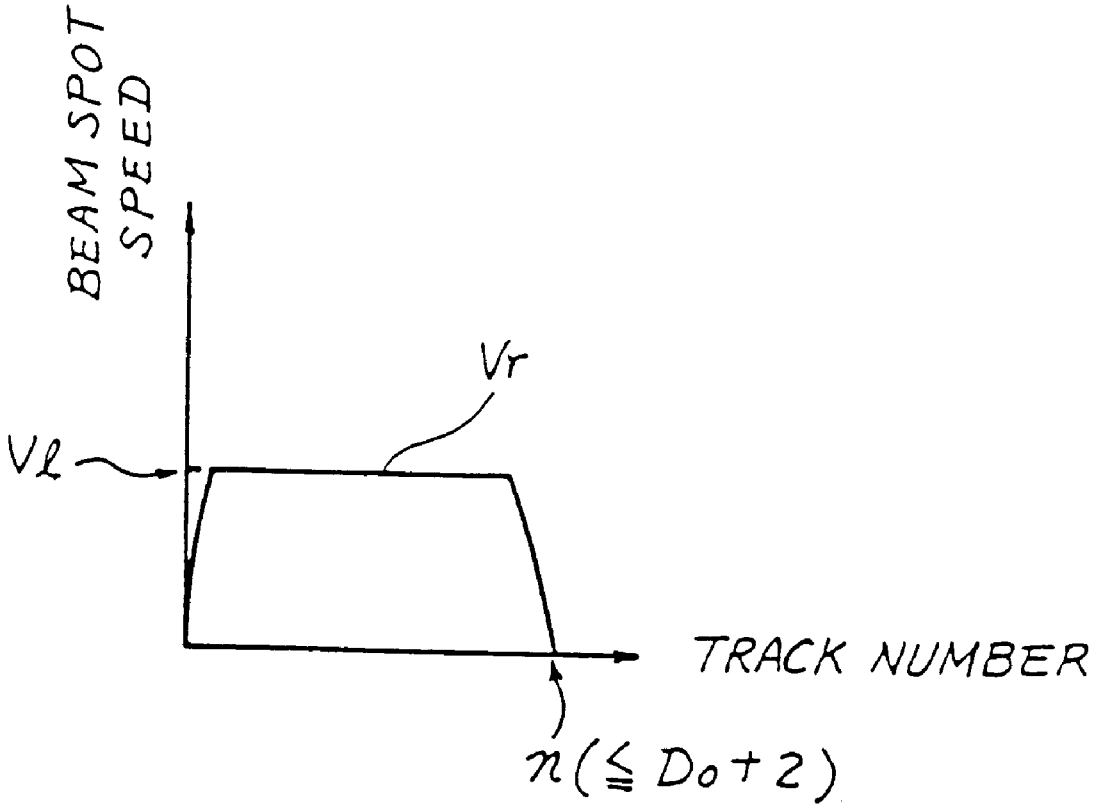

FIG. 13A shows the dependence of the track number where the beam spot is located and the time lapse on the X axis, to the beam spot speed, tracking error signal TES, track zero-cross signal TZCS and the acceleration/deceleration signal on the Y axis.

When the MPU 7 is instructed from an upper processor to start the track access, if the instructed number of tracks to be jumped "n" is larger than ($D_0$+2), a target speed is set at a high target speed Vh up to the (n−$D_0$−2)th track which is near the destination track as shown in FIG. 13A; and after the (n+$D_0$−2)th track the target speed is set at a low target speed Vl, where $D_0$ is a number chosen so that the beam spot can easily stop at the destination track from the low target speed while crossing $D_0$ tracks, allowing enough margin to compensate for the inertia, etc., of the movable part of the lens system. The number $D_0$ is referred to hereinafter as a speed switching track number. The amount of the high target speed Vh is chosen as the highest speed at which lens control is possible in order to enhance the high speed capability. The amount of the low target speed Vl is chosen as a speed at which the beam spot can stop at the destination track while crossing a single track. Vl is typically 200 $\mu$s per track. When the instructed track jump number n is less than ($D_0$+2), the target speed is set at only Vl as shown in FIG. 13B. FIGS. 13A and 13B show an actual speed Vr of the beam spot when the beam spot is controlled by the target speeds.

Referring to the flow charts in FIGS. 14A. 14B, and 14C, the operation of the track-by-track speed control method is hereinafter explained. It is now assumed that the servo-on signal SVS from MPU 7 is enabling the servo switch 35, and the disabled lock-on signal LKS is disabling the lock switch 37, until the track jump instruction is received. In other words, it is assumed that the fine tracking servo loop is closed so that the track actuator 21 is servo-controlled by the control signal TCS from the tracking error signal TES. Accordingly, the beam spot is tracing the track 10*a* of FIG. 15A.

Figure 14A:
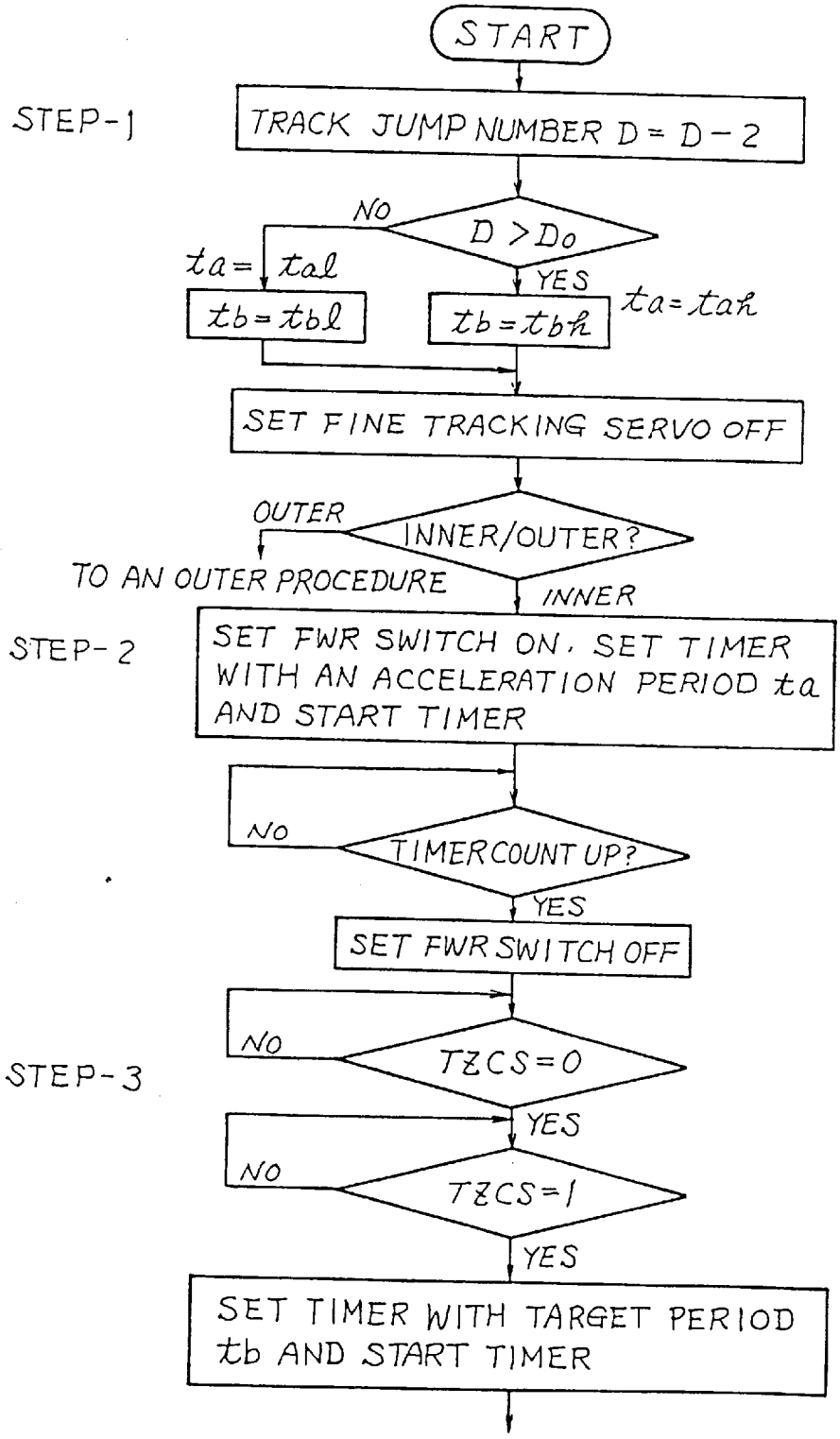
FIGS. 14A, 14B and 14C are flow charts of the track-by-track speed control method of the present invention of FIGS. 13A and 13B.
Figure 14B:
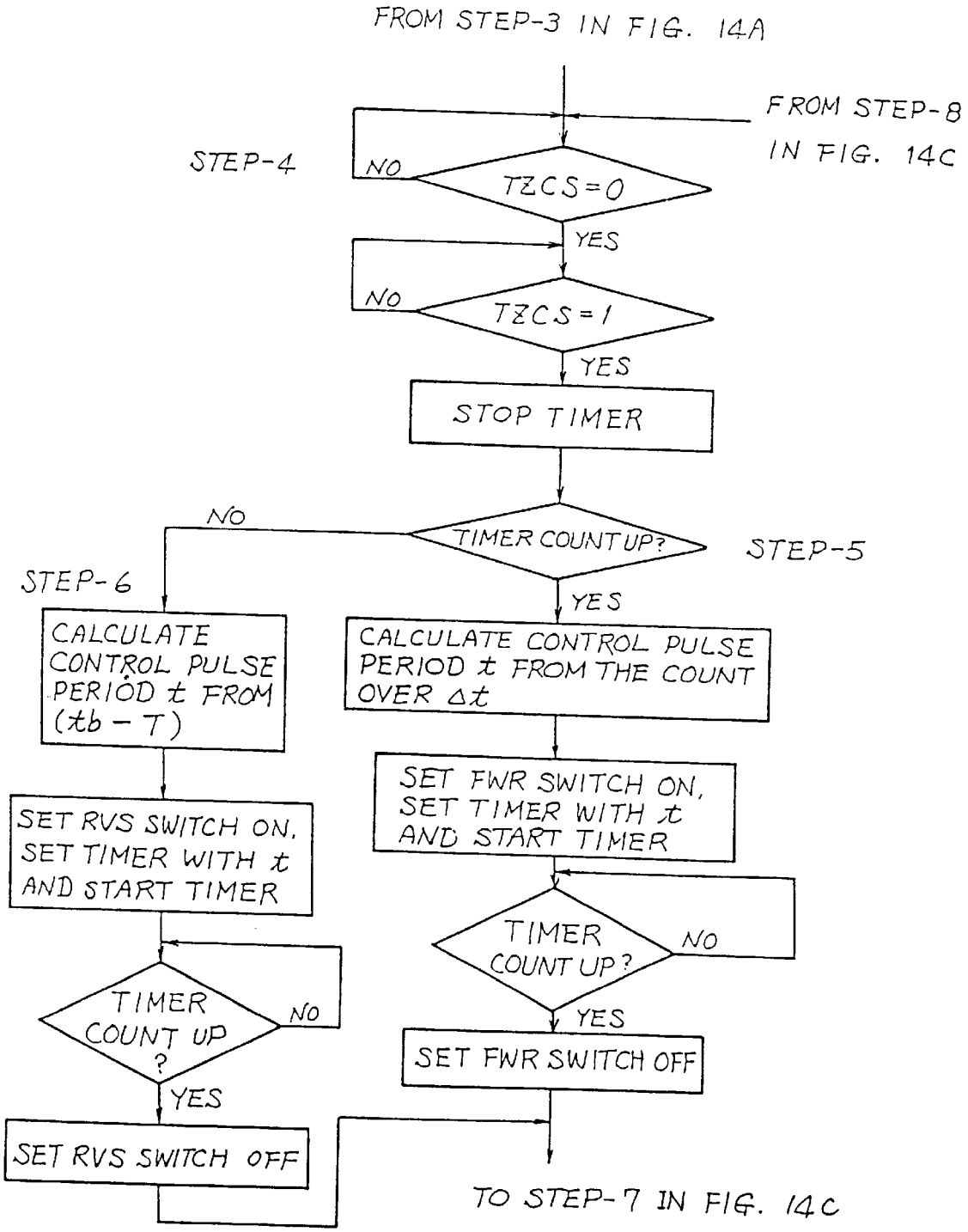
Figure 14C:
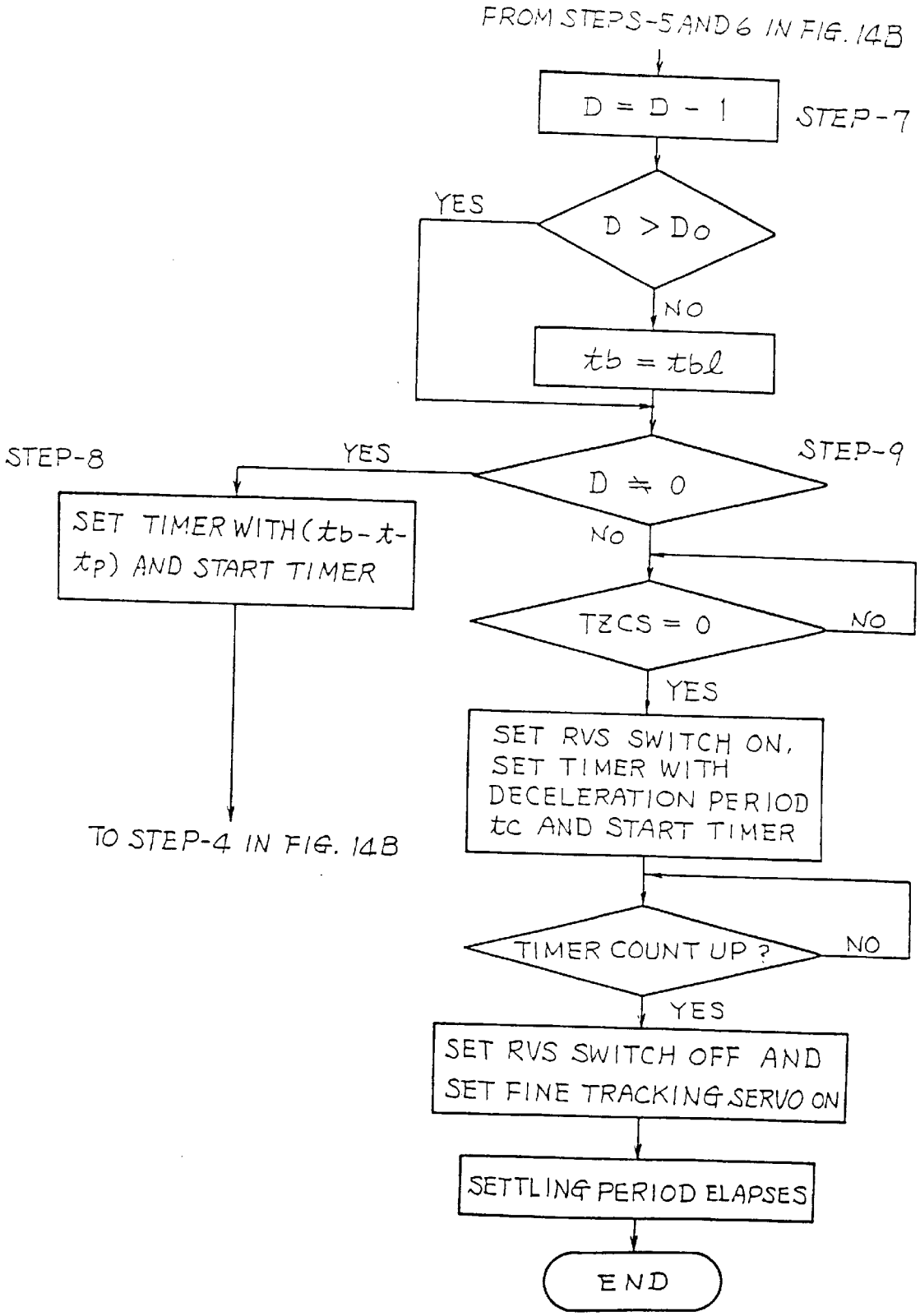

In step (1) of FIG. 14A, in the state previously described, a track jump procedure shown in FIGS. 14A, 14B, and 14C starts when a track jump instruction and its track jump number D is given from the upper processor to MPU 7. In this embodiment, the instructed track jump is toward the inner direction. At first, MPU 7 subtracts the number [2] from the given track jump number D=(n), and stores it in the memory 7*b*. D is reduced by [2] because an acceleration is made during the travel toward the second track 10*b* of FIG. 15A and a deceleration is made for stopping at the destination, D-th, track. Therefore, these initial and final track crossings are reduced from D and a track-by-track speed control is carried out (D=2) times for the residual tracks.

Next, MPU 7 compares the track number D=(n−2) with the speed switching track number $D_0$; then, if D>$D_0$, the situation is the same as that of FIG. 13A, where the target speed tb is set with the high target speed Vbh; and the acceleration period ta is set with tah for the acceleration up to the speed Vh. If D≦$D_0$, the situation is the same as that of FIG. 13B, where the target speed tb is set with the low target speed Vbl; and the acceleration period ta is set with tal for the acceleration up to the speed Vl. Next, MPU 7 disables the servo signal SVS to disable the servo switch 35, so as to open the servo loop of the tracking error signal TES. Thus, the servo control of the tracking error signal TES is inhibited. This is necessary to smoothly control the travel of the beam spot as instructed by MPU 7, and to acquire an accurate actual speed from the track error signal TES. Next, MPU 7 checks which direction the track jump is directed to, i.e. toward the outer direction or inner direction along the radius of the optical disk 1, and then, if the direction is in the outer direction, a procedure for the outer direction is executed. The procedure for the track jump toward the outer side is almost the same as the track jump process toward the inner side shown from step (2) onward in FIGS. 14A, 14B, and 14C.

In step (2) of FIG. 14A, MPU 7 enables the lens forwarding signal FWR for the acceleration period ta so as to apply the acceleration voltage +V for the period ta. That is, after outputting the lens forwarding signal FWR, MPU 7 sets the timer 7*a* with a complement of the acceleration period ta in the memory 7*b*, and then starts the timer 7*a*. The timer 7*a* being set with the complement of the acceleration period ta counts the clock pulses, and generates a count-up signal when the period ta is counted. When the timer 7*a* generates the count-up signal, MPU 7 terminates the timer 7*a* and disables the lens forwarding signal FWR. Therefore, the first switch 381 of the driver circuit 38 is enabled for the period ta; the acceleration voltage +V is applied to the adder amplifier 380 for the period ta; an acceleration current is applied as the track driving current TDV from the power amplifier 39 to the track actuator 21 for the period ta; accordingly, the object lens 20 (i.e. the beam spot) is accelerated up to the high target speed Vh.

In step (3) of FIG. 14A, MPU 7 observes the track zero-cross signal TZCS and detects a timing when the track zero-cross signal TZCS changes from "0" state to "1" state, i.e. a rise transition of the track zero-cross signal TZCS, and then starts measuring an interval of the track zero-cross signals TZCS. That is to say, MPU 7 reads out the target period tb (tbh or tbl) corresponding to the target speed Vh or Vl, respectively, from the memory 7*b*: sets a complement of the target period tb in the timer 7*b*; sets a complement of the target period tb in the timer 7*b*; and then starts the timer 7*b*.

In step (4) of FIG. 14B, MPU 7 observes the track zero-cross signal TZCS and detects the rise transition, i.e. from "0" state to "1" state, of the track zero-cross signal TZCS and then stops the timer 7*a* so as to terminate measuring the interval of the track zero-cross signals TZCS. The timer 7*a* being set with the complement of the target period tb generates a count-up signal when the period tb is counted. Therefore, if the time interval T between a rise transition, at which the timer 7*a* is started, and the next rise transition, at which the timer is terminated, is T≧tb (i.e. the actual speed is equal to or slower than the target speed), the timer 7*a* has been already counted up when the timer 7*a* is terminated. On the other hand, if T≦tb (i.e. the actual speed is faster than the target speed), the timer 7*a* is not counted up yet when the timer 7*a* is terminated.

In step (5) of FIG. 14B, MPU 7, therefore, checks whether the timer 7*a* is counted up. On finding a count-up, which means the actual speed is equal to or slower than the target speed, the lens acceleration is performed. The timer 7*a* continues to count until the timer 7*a* terminates even after counting up; therefore, MPU 7 reads out a count-over amount Δt and calculates therefrom a control pulse period t. Then, MPU 7 outputs the lens forwarding signal FWR for the lens acceleration; sets a complement of the control pulse period t in the timer 7*a*; and initiates the timer 7*a*. On counting the control pulse period t, the timer 7*a* finishes its count; therefore MPU 7 terminates the timer 7*a* so as to disable the lens forwarding signal FWR. Thus, the first switch 381 of the driver circuit 38 is enabled for the period t; the acceleration voltage +V is applied to the adder amplifier 380; the acceleration current is applied as the track driving current TDV from the power amplifier 39 to the track actuator 21 for the period t; accordingly, the lens 20 is accelerated. If the actual speed is equal to the target speed, then Δt=0, accordingly t=0; therefore, the first switch 381 is enabled only for a moment.

In step (6) of FIG. 14B, on the other hand, when the timer 7*a* has not finished its count, MPU 7 discriminates that the actual speed is faster than the target speed, and decelerates the lens. For this purpose, MPU 7 reads out the counted number n of the timer 7*a*. The count-up number N of the timer 7*a* is known in advance; therefore, the difference (tb−T)=Δt between the target period tb and the interval (period T) of the rise transitions of the track zero-cross signals TZCS is acquired from (N−n), so as to calculate the control pulse period t.

Then, MPU 7 enables the lens reversing signal RVS for lens deceleration; sets a complement of the control pulse period t in the timer 7*a*; and then initiates the timer 7*a*. When timer 7*a* finishes the count, MPU 7 stops the timer 7*a* and disables the lens reversing signal RVS. Therefore, the second switch 382 of the driver circuit 38 is enabled for the period t; the deceleration voltage −V is applied to the adder amplifier 380; the deceleration current as the track driving current TDV is applied from the power amplifier 39 to the track actuator 21 for the period t; thus the lens 20 is decelerated.

In step (7) of FIG. 14C, because a rise transition of the track zero-cross signal TZCS has been detected in step (4) of FIG. 14B, MPU 7 changes the track jump number D in the memory 7*b* to (D−1) after step (5) or step (6) of FIG. 14B.

Next, MPU 7 discriminates to determine whether the renewed track jump number D is less than the speed switching track number $D_0$ or not. If the remaining track jump number D is less than or equal to the speed switching track number $D_0$ (i.e. $D \leqq D_0$), excluding the case where the target speed is set with the low target speed Vl already, the target speed tb is changed to the low target speed Vl. If D is not greater than $D_0$, the target speed remains the high target speed Vh.

Next, MPU 7 discriminates whether D=0 or not. If D≠0 is true, it means that the beam spot has not arrived at the track next to the target track yet. If D≠0 is not true (i.e. D=0), the beam spot has arrived at the track immediately before the target track.

In step (8) of FIG. 14C, if D≠0 is true, the measurement of the interval of the track zero-cross signals and the above-described track-by-track speed control is carried out again. For this purpose, MPU 7 sets the target period tb in the timer 7*a*; initiates the timer 7*a*; and returns to step (4) of FIG. 14B. At this time, since the time when the rise transition was detected in step (4) of FIG. 14B, the control pulse period t and the process period tp needed for the processes in the steps (5) or (6) and (7) has elapsed. Therefore, the target period tb in the timer 7*a* is set with (tb−t−tp).

In step (9) of FIG. 14C, after thus repeating the track-by-track speed controls according to the prior steps, the beam spot arrives at the track immediately before the destination track, and then discrimination determines that D=0. Now, MPU 7 instructs the lens to stop. That is, observing the track zero-cross signal TZCS, MPU 7 discriminates to determine whether a fall transition, i.e. from "1" to "0", of the track zero-cross signal TZCS, takes place indicating the time to begin the lens deceleration. The fall transition in the track zero-cross signal TZCS indicates that the beam spot crosses to an adjacent track. On detecting the fall transition of the track zero-cross signal TZCS, MPU 7 outputs the lens reversing signal RVS so as to start the lens deceleration; sets a complement of the predetermined deceleration period tc in the timer 7*a*; and then initiates the timer 7*a*. When the timer 7*a* finishes its count, i.e. the period tc is counted, MPU 7 disables the lens reversing signal RVS and outputs the servo-on signal SVS, then the track jumping is terminated after a predetermined adjusting period has elapsed. That is to say, the second switch 382 of the driving circuit 38 is enabled for the period tc; the deceleration voltage −Vc is applied to the adder amplifier 380 for the period tc; a deceleration current as a track driving current TDV is applied from the power amplifier 39 to the track actuator 21 for the period tc; and accordingly the lens, i.e. the beam spot, is decelerated to stop. Then, the servo switch 35 is enabled to close the servo loop of the tracking error signal TES; the track driving current TDV according to the control signal TCS of the phase compensation circuit 33 is applied from the power amplifier 39 to the track actuator 21. Accordingly, the fine tracking servo control is started. When the servo switch 35 is enabled, the beam spot is located on the destination track and its speed is zero. Therefore, the track servo control can be smoothly started.

Though in the description of the preferred embodiment of the track-by-track speed control the lens lock is kept disabled, the track-by-track speed control can also be achieved while the lens lock is kept enabled. This is because the lens lock can be overridden by the signal of the lens seek. For a case where the lens lock is mechanically made with a spring or a rubber damper, there is no way to disable the lens lock.

Figure 15A:
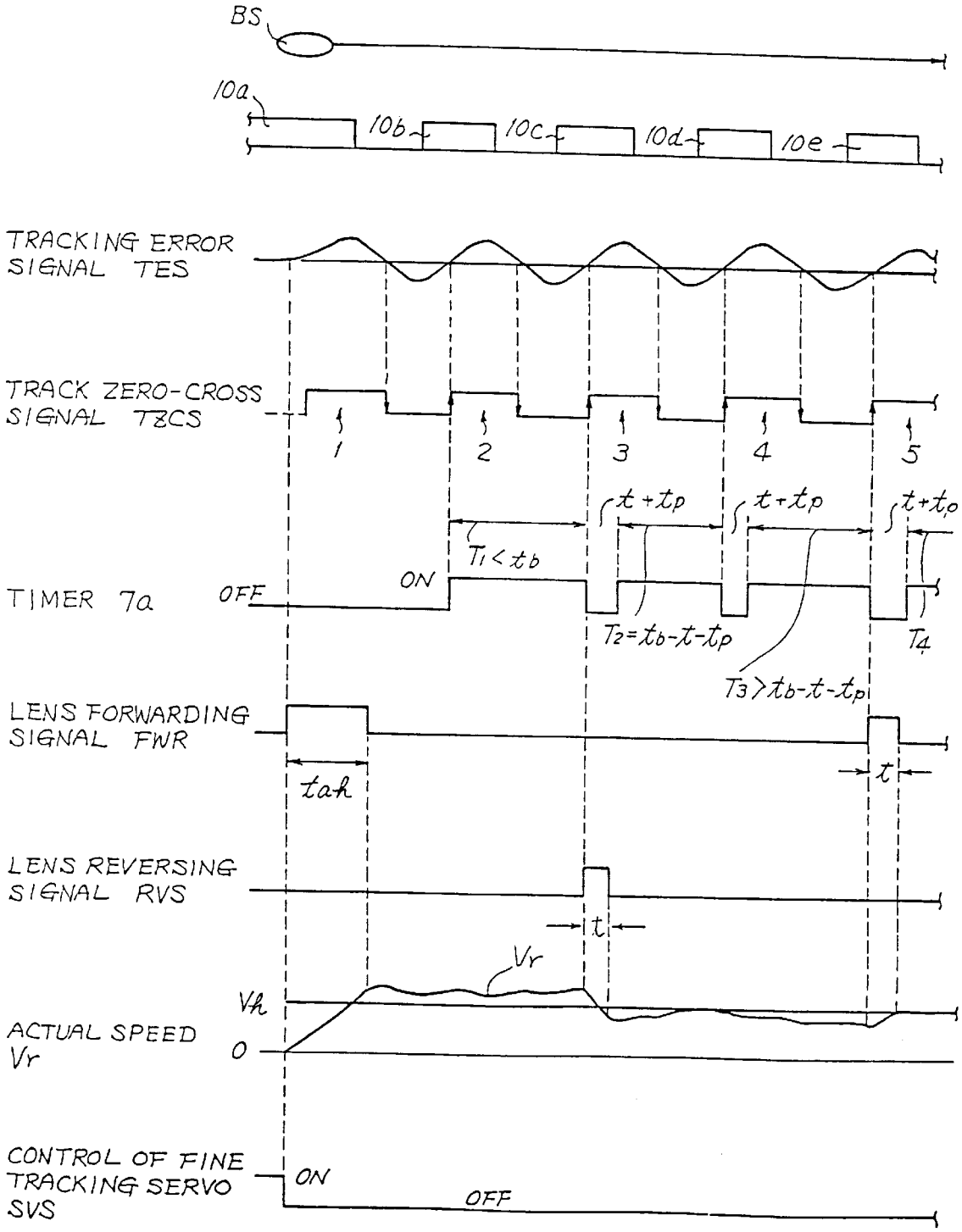
FIGS. 15A and 15B are timing diagrams of the track-by-track speed control method of the present invention of FIGS. 13A and 13B and FIGS. 14A, 14B, and 14C.
Figure 15B:
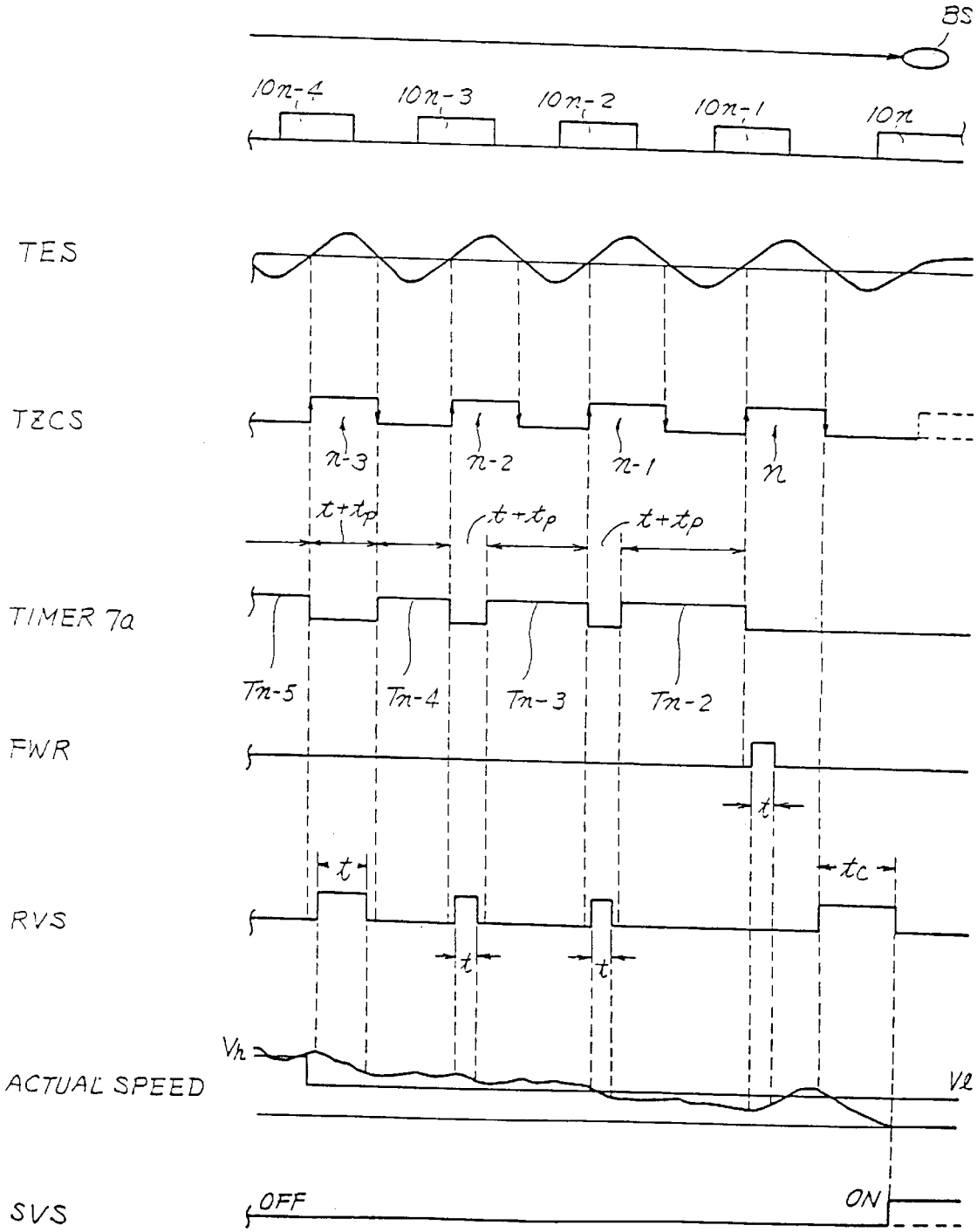

Details of the timing chart of FIGS. 15A and 15B are hereinafter described. FIGS. 15A and 15B show waveforms when a track-jumping is carried out from track 10*a* to the fifth-next track 10*f*.

To begin the operation, the fine tracking servo is disabled, the lens forwarding signal FWR is output, and the acceleration current is applied for the period tah so that the beam spot reaches the target speed Vh. Next, a time interval $T_1$ between the second and third rise transitions of the track zero-cross signal TZCS is measured by enabling the timer 7*a* so that the actual speed is obtained, and then is compared with the target period tbh which corresponds to the target speed Vh. If tbh>$T_1$, it means the actual speed is faster than the target speed Vh according to the step (6). Therefore, the lens reversing signal RVS is output for the period t which corresponds to the speed difference (tb−$T_1$). Accordingly, a deceleration current is applied to the actuator coil 21 for the period t so as to retard the actual speed to the target speed Vh.

Next, the interval between the third and fourth rise transitions of the track zero-cross signal TZCS is measured. However, the measurement of the interval after the third rise transition of the track zero-cross signal TZCS is impossible because the track-by-track speed control (the steps (5), (6) and (7) of FIGS. 14B and 14C) is being carried out after the third rise transition of the track zero-cross signal TZCS as mentioned above. Therefore, after entering the track-by-track speed control, the timer 7*a* is enabled. The interval until the fourth rise transition is measured, and the target period tb is set (tb−t−tp) in order to meet this interval. In this example, this interval $T_2$ is equal to the target period tb=(tb−t−tp). Therefore, an acceleration/deceleration is not actually carried out according to step (5) of FIG. 14B.

In a similar way, the track-by-track speed control is carried out between the fourth and fifth rise transitions. In this case the interval $T_3$ is larger than (tb−t−tp), i.e. the actual speed is slower than the target speed Vh. Therefore, an acceleration is carried out for the period t. Thus, when the beam spot controlled at the high target speed Vh arrives at the (n−4) th track (10*n*−4), the target speed is switched to the low target speed Vl, because the beam spot is now close to the destination track.

In a similar manner, at the (n−3) th (n−2) th rise transitions of the track zero-cross signal TZCS the track-by-track speed control is carried out at the low target speed Vl. Deceleration current is applied for a period tc in synchronization with the n-th fall transition of the track zero-cross signal TZCS so as to decelerate the lens (i.e. the beam spot) to stop. Immediately after this, the fine tracking servo control is enabled. The track jump number D is also updated by the rise transition of the track zero-cross signal TZCS.

Track jumping toward the outer direction is almost the same as those mentioned above in steps (2) to (9) of FIGS. 14A, 14B, and 14C for the inner-ward jump, because the difference is only in that the direction is reversed. That is, all the procedures are carried out in the same way as those for the jump toward the inner direction except: the lens forwarding signal FWR via the forward switch 381 is replaced by the lens reversing signal RVS via the reverse switch 382 in step (2) and (5) of FIG. 14A; and the lens reversing signal RVS via the reverse switch 382 is replaced by the lens forwarding signal FWR via the forward switch 381 in the steps (6) and (9) of FIGS. 14B and 14C; the detection of the rise transitions of the track zero-cross signal TZCS in the steps (3) and (4) of FIGS. 14A and 14B are replaced by the detection of the fall transitions; and the discrimination of TZCS=0 in step (9) of FIG. 14C is replaced by the discrimination of TZCS=1.

As described above, the beam spot BS, after the initiation of acceleration, is controlled at the high target speed Vh. Thus, the beam spot travels at the highest possible speed and is decelerated to a low target speed Vl, which allows the beam spot to surely stop, in the vicinity of the destination track. Then the beam spot is positioned with certainty at the destination track, so that the long distance quick track jump is achieved without stopping at each track. For the case where a great number of tracks, for example a thousand tracks, are to be jumped, the prior art required 40 ms for the coarse seek (carriage seek) including the period required for entering the fine tracking servo, 1 ms for the confirmation by reading the track ID, and 6 ms for a fine seek (lens seek) for 20 tracks. Consequently, the prior art required 47 ms in total to complete a large jump. However, with the present invention an accurate track jump is achieved with 2 ms for the 10 tracks of the lens seek acceleration, 30 ms for the coarse seek, and 6 ms for the 20 tracks of the lens seek deceleration. Consequently, the disclosed method requires only 38 ms in total, without requiring the 1 ms for the confirmation by reading the track ID.

The track-by-track speed control is carried out, as described already, by measuring the time interval between rise transitions of the track zero-cross signal TZCS. This speed control, i.e. the measurement of the time interval, is carried out easily with an addition or modification of a program without modifying the hardware.

Because the actual speed is compared with the target speed according to the target period loaded in the memory, the compared result is given from the count-up signal. Therefore, the complicated comparison procedure of other art is simplified in the disclosed inventions to reduce the process steps, resulting in fast operation. Thus, the track-by-track speed control of the present invention is beneficial in the access of less than about a hundred tracks.

Though in the above-described embodiment the target speeds are set with two speeds, high and low, the target speeds can be set with more than two speeds. Furthermore, the target speed can be a single speed as long as the beam spot can stop surely at the destination track without being effected by the eccentric movement of the tracks.

Though in the above-described embodiments the tracking error signal TES is generated by means of a push-pull method, other known methods may of course be used to generate the tracking error signal.

Though in the above-described embodiments the detection of the beam spot speed difference is carried out by loading the timer 7*a* with a target period, the detection of the beam spot speed difference can also be carried out by measuring a time interval of the transitions in the track zero-cross signal TZCS by the timer 7*a* which is then compared with the target period. Furthermore, the timer can be a software timer. Also, the gain of the feedback loop of the speed control during the track jump may be varied.

Though in most of the above-described embodiments the carriage is moving at some point in a track crossing operation, the present invention includes a method of controlling track jumping of a plurality of recording tracks of a recording medium of an optical recording apparatus, the recording medium having eccentric tracks, the optical apparatus having:

fine tracking means for moving a light beam spot on the recording medium along essentially radial direction of the tracks, the fine tracking means being movable on a carriage means and having a neutral position on the carriage means, and being capable of causing the beam spot to cross a track;

light detecting means for detecting a light reflected from the beam spot so as to generate a tracking error signal; and fine tracking control means capable of servo controlling the beam spot by moving the fine tracking means on the carriage according to the tracking error signal which allows the beam spot to trace a particular one of the tracks, comprising the steps of:

(a) measuring a time interval between zero crossings in the tracking error signal, for each track-crossing, while the beam spot is crossing to each adjacent track;

(b) obtaining a time interval difference between the time interval of zero crossings and a first predetermined time interval; and (c) accelerating or decelerating the beam spot by accelerating or decelerating the fine tracking means on the carriage according to the time difference, so as to make the time interval of the zero crossings essentially equal to the first predetermined time interval, without stopping the beam spot at each track, wherein said steps (a) through (c) are carried out while the carriage is stationarily fixed. Further, the steps (a) through (c) may be repeated with the predetermined time interval renewed.

Though in the above-described embodiments the explanations are made with the cases where the fine tracking servo control is carried out by moving a lens along the radial direction of the tracks, it is apparent that the present invention can be applied to a fine tracking servo of a galvano mirror type.

Though in the above-described embodiments the embodiments are made using a positive logic, it is apparent that negative logic is also applicable to an embodiment of the present invention.

Though the descriptions are made for the optical disk apparatus, the present inventions are applicable to an optical card apparatus, etc., using an optical memory media having a known track. The present inventions can also utilize not only a reflection type but also a transparent type of disk.

What is claimed is:

1. A method of track jumping of a plurality of coaxial or spiral recording tracks on a recording medium of an optical recording apparatus, the recording medium having eccentric recording tracks, the optical apparatus having:

fine tracking means for moving a light beam spot on the recording medium, along essentially radial directions of the tracks;

carriage means capable of moving along an essentially radial direction of the tracks, having the fine tracking means installed thereon, the fine tracking means movable on the carriage means over the tracks along essentially radial directions of the tracks and having a neutral position on the carriage means;

light detecting means for detecting a light reflected from the recording medium so as to generate a tracking error signal;

fine tracking control means capable of servo controlling the beam spot by moving the fine tracking means on the carriage means according to the tracking error signal for the beam spot to trace a particular one of the tracks;

carriage tracking control means for moving the carriage means; and position servo means for keeping the fine tracking means at a neutral position on the carriage means by moving the carriage means according to a position signal, the position signal becoming zero when the fine tracking means is at the neutral position and becoming positive or negative when deviating from the neutral position to an inward direction or to an outward direction on the recording medium respectively, comprising the steps of:

(a) accelerating the beam spot by accelerating the fine tracking means until a speed of the beam spot exceeds an absolute radial speed of the eccentric tracks, while the fine tracking servo control of the beam spot is disabled and the position servo means is kept enabled;

(b) further accelerating the beam spot by moving the carriage means;

(c) decelerating the beam spot by decelerating the carriage means until the speed of the beam spot reaches a predetermined speed below which the fine tracking control is possible;

(d) counting a number of zero crossings in the tracking error signal since the track jumping was initiated, whereby a track number where the beam spot is currently located is acquired; and (e) decelerating the beam spot by decelerating the fine tracking means on the carriage means according to a difference of the counted number of crossed tracks and instructed number of track jumping to reach a destination track where the beam spot is to stop.

2. A method according to claim 1, wherein said step (a) further comprises the substeps of:

(a1) measuring a time interval between zero-crossings in the tracking error signal, for each track crossing, while the beam spot is moving;

(a2) obtaining a time interval difference between the time interval of zero crossings and a first predetermined time interval which corresponds to a first predetermined speed faster than the absolute radial speed of the eccentric tracks; and (a3) accelerating or decelerating the beam spot by accelerating/decelerating the fine tracking means according to the time interval difference so as to make the time interval of the zero-crossings essentially equal to the first predetermined time interval, without stopping the beam spot at each track.

3. A method according to claim 1, wherein said step (e) further comprises the sub-steps of:

(e1) measuring a first time interval between zero-crossings in the tracking error signal, for each track crossing, while the beam spot is moving;

(e2) obtaining a time difference between the first time interval of zero-crossings and a second predetermined time interval; and (e3) accelerating or decelerating the beam spot according to the time difference so as to make the time interval of the zero-crossings essentially equal to the second predetermined time interval, without stopping the beam spot at each track.

4. A method according to claim [2 or] 3, wherein said measuring substep utilizes a second time interval between zero-crossings in the tracking error signal determined by an interval of adjacent transitions of zero-crossings, the transitions being from one polarity to an opposite polarity, the zero-crossings being generated when the beam spot passes a centre of each track.

5. A method according to claim 3, further comprising the steps of:

repeating said steps (a) through (c) with respectively renewed predetermined time interval and a renewed instructed track, the renewed predetermined time interval being longer than the previous predetermined time interval, the renewed instructed track being closer to the destination track than the previously instructed track.

6. A method according to claim 5, wherein said repeating step utilizes a fixed predetermined time interval which is chosen long enough, and a final instructed track which is chosen near enough to the destination track, for the beam spot to be able to stop surely at the destination track.

7. A method according to claim 1, wherein said step (c) is repeated until the beam spot arrives at a track whose track number is calculated by a program prepared in advance according to an instructed number of tracks to be jumped.

8. A method according to claim 7, wherein said step (c) is repeated for a number of tracks determined by a program to be approximately half of the instructed number of tracks to be jumped.

9. A method according to claim 1 [or 3], wherein said step (e) is carried out while the position servo means is enabled.

10. A method of track jumping of a plurality of coaxial or spiral recording tracks on a recording medium of an optical apparatus, the recording medium having eccentric tracks, the optical apparatus having:

fine tracking means for moving a beam spot on the recording medium along essentially radial directions of the tracks;

carriage means capable of moving along an essentially radial direction of the tracks, having the fine tracking means installed thereon, the fine tracking means movable on the carriage means over the tracks along an essentially radial direction of the tracks, and having a neutral position on the carriage means;

*position detection means for detecting a position of the fine tracking means with respect to the carriage means and for outputting a position signal;* light detecting means for detecting a light reflected from the recording medium so as to generate a tracking error signal;

fine tracking control means capable of servo controlling the beam spot by moving the fine tracking means on the carriage means according to the tracking error signal for the beam spot to trace a particular one of the tracks; and carriage tracking control means for moving the carriage means, comprising the steps of:

(a) accelerating the carriage means while enabling the fine tracking control means for the beam spot which allows the beam spot to maintain its position at a start track at which the beam spot is located when the track jumping is instructed;

(b) disabling the fine tracking control means, when the position signal reaches a predetermined level, whereby the fine tracking means returns to the neutral position and the beam spot crosses the tracks;

(c) further accelerating the beam spot by further accelerating the carriage means until the beam spot reaches a predetermined track;

(d) decelerating the beam spot by decelerating the carriage means until a speed of the beam spot reaches a predetermined speed below which the fine tracking control is possible;

(e) counting a number of zero crossings in the tracking error signal since the track jumping was initiated, whereby the track number where the beam spot is currently located is acquired; and (f) moving the beam spot by moving the fine tracking means on the carriage means according to a difference of the counted number of crossed tracks and an instructed number of track jumps so as to reach a destination track where the beam spot is to stop.

11. A method according to claim 10, wherein said step (f) further comprises the substeps of:

(f1) measuring a time interval between zero-crossings in the tracking error signal, while the beam spot is moving, for each track;

(f2) obtaining a time interval difference between the time interval of zero-crossings and a first predetermined time interval; and (f3) accelerating or decelerating the beam spot according to the time difference so as to make the time interval of the zero-crossings essentially equal to the first predetermined time interval, without stopping the beam spot at each track.

12. A method according to claim 11, wherein said measuring substep utilizes a second time interval between zero-crossings in the tracking error signal determined by an interval of adjacent transitions of zero-crossings, the transitions being from one polarity to an opposite polarity, the zero-crossings being generated when the beam spot passes a centre of each track.

13. A method according to claim 11, further comprising the steps of:

repeating the steps (a) through (c) with respectively renewed predetermined time interval and a renewed instructed track, the renewed predetermined time interval being longer than the previous predetermined time interval, the renewed instructed track being closer to the destination track than the previous instructed track.

14. A method according to claim 13, wherein said repeating step utilizes a fixed predetermined time interval which is chosen long enough, and a final instructed track which is chosen near enough to the destination track, for the beam spot to be able to stop surely at the destination track.

15. A method according to claim 10, wherein said step (b) is continued until the beam spot arrives at a track whose track number is calculated by a program prepared in advance according to an instructed number of tracks to be jumped.

16. A method according to claim 15, wherein said step (c) is repeated for a number of tracks determined by a program to be approximately half of the instructed number of tracks to be jumped.

17. A method according to claim 10 [or 11], wherein said step (f) is carried out while the position servo means is enabled, the position servo means keeping the fine tracking means at a neutral position on the carriage means by moving the carriage means according to a position signal, the position signal becoming zero when the fine tracking means is at the neutral position on the carriage means and becoming positive or negative when deviating from the neutral position to one direction or to the opposite direction respectively.

18. A method of controlling track jumping of a plurality of recording tracks on a recording medium of an optical recording apparatus, the recording medium having eccentric tracks, the optical apparatus having:

fine tracking means for moving a light beam spot on the recording medium along essentially radial directions of the tracks, the fine tracking means being movable on a carriage means and having a neutral position on the carriage means, and being capable of causing the beam spot to cross a track;

light detecting means for detecting a light reflected from the beam spot so as to generate a tracking error signal; and fine tracking control means capable of servo controlling the beam spot by moving the fine tracking means on the carriage according to the tracking error signal which allows the beam spot to trace a particular one of the tracks, comprising the steps of:

(a) measuring a time interval between [ero-crossings] *zero-crossings* in the tracking error signal, for each track crossing, while the beam spot is crossing to each adjacent track;

(b) obtaining a time interval difference between the time interval of [ero-crossings] *zero-crossings* and a first predetermined time interval; and (c) accelerating or decelerating the beam spot by accelerating or decelerating the fine tracking means on the carriage according to the time difference, so as to make the time interval of the [ero-crossings] *zero-crossings* essentially equal to the first predetermined time interval, without stopping the beam spot at each track.

19. A method according to claim 18, further comprising the substeps of:

repeating steps (a) through (c) with the predetermined time interval renewed.

20. A method according to claim 18 [or 19], wherein said steps (a) through (c) are carried out while the carriage is stationarily fixed.

21. A method according to claim 18 [or 19], wherein said steps (a) through (c) are carried out while the position servo means is enabled, the position servo means keeping the fine tracking means at the neutral position of the carriage means by moving the carriage means according to a position signal, the position signal becoming zero when the fine tracking means is at the neutral position on the carriage means and becoming positive or negative when deviating from the neutral position to one direction or to the opposite direction respectively.

22. A method according to claim 18 [or 19], wherein said measuring step utilizes a time interval between zero-crossings in the tracking error signal measured by an interval of adjacent zero-crossings, the transition being from a first polarity to an opposite polarity, the zero-crossings being generated when the beam spot passes a centre of each track.

23. A method according to claim 18 [or 19], wherein said steps (b) and (c) utilize a fixed predetermined time interval which is chosen long enough, and a final instructed track which is chosen near enough to the destination track, for the fine tracking means to be able to stop surely at the destination track.

24. A method of changing a position of an optical beam having a beam spot relative to a plurality of tracks of a recording medium from a start track to a destination track, the recording medium having eccentric recording tracks, comprising the steps of:

(a) accelerating the beam spot until [the] *a* beam spot speed in a direction substantially perpendicular to the tracks exceeds an absolute radial speed of the eccentric recording tracks of the recording medium before a first track to be crossed is actually crossed;

(b) controlling the beam spot speed to maintain the beam spot speed at or below a first predetermined speed at which the beam spot can be stopped at a destination track;

(c) counting a number of *the* tracks crossed since [the start of] said *accelerating started in* step (a); and (d) decelerating the beam spot based on a difference between the counted number of tracks crossed and a number of tracks to be crossed from the start track to the destination track while ensuring that the beam spot speed does not fall below the absolute radial speed of the eccentric tracks until a last track to be crossed is actually crossed.

25. A method according to claim 24, [wherein said step (b)] further [comprises] *comprising* the [substeps] *steps* of:

[(b1)] (*e*) measuring a time interval for a track crossing while the beam spot is moving;

[(b2)] (*f*) obtaining a *first* time interval difference between the time interval for the track crossing and a first predetermined time interval which corresponds to a [second] predetermined speed faster than the absolute radial speed of the [eccentric] tracks; and

[(b3)] (*g*) accelerating or decelerating the beam spot [by accelerating or decelerating the beam spot] according to the time interval [so as] to make the time interval of the track crossings essentially equal to the first predetermined time interval without stopping the beam spot at each track.

26. A method according to claim 25, wherein said [substep (b1)] *measuring in step* (*e*) comprises measuring a second time interval corresponding to one-half of a track crossing, and wherein said [substep (b2)] *obtaining in step* (*f*) comprises obtaining a second time interval difference between the second time interval corresponding to one-half of a track crossing and a second predetermined time interval.

27. A method according to claim 25, wherein said substep [(b1)] (*e*) comprises measuring a third time interval corresponding to one-quarter of a track crossing, and wherein said substep [(b2)] (*f*) comprises obtaining a third time interval difference between the third time interval corresponding to one-quarter of a track crossing and a third predetermined time interval.

28. A method according to claim 24, [wherein said step (d)] further [comprises] *comprising* the [substeps] *steps* of:

[(d1)] (*e*) measuring a time interval of a track crossing while the beam spot is moving;

[(d2)] (*f*) obtaining a time interval difference between the time interval for the track crossing and a first predetermined time interval; and

[(d3)] (*g*) decelerating the beam spot according to the time interval difference [so as] to make the time interval of the track crossing essentially equal to the first predetermined time interval without stopping the beam spot at each track.

29. A method according to claim 28, wherein said [substep (d1)] *measuring in step* (*e*) comprises measuring a second time interval corresponding to one-half of a track crossing, and wherein said [substep (d2)] *obtaining in step* (*f*) comprises obtaining a second time interval difference between the second time interval corresponding to one-half of a track crossing and a second predetermined time interval.

30. A method according to claim 28, wherein said [substep (d1)] *measuring in step* (*e*) comprises measuring a [third] *second* time interval corresponding to one-quarter of a track crossing, and wherein said [substep (d2)] *obtaining in step* (*f*) comprises obtaining a [third] *second* time interval difference between the [third] *second* time interval corresponding to one-quarter of a track crossing and a [third] *second* predetermined time interval.

31. A method according to claim 28, further comprising [the steps of:] repeating said [substeps (d1)] *measuring in step* (*e*) and [(d3)] *said decelerating in step* (*g*) with a renewed predetermined time interval.

32. A method according to claim 24, wherein said *controlling in* step (b) is carried out until the beam spot reaches a predetermined track whose number is calculated by a program prepared in advance according to the number of tracks to be crossed from the start track to the destination track.

33. A method of changing a position of an optical beam having a beam spot *moving at a beam spot speed* relative to a plurality of tracks of a recording medium from a start track to a destination track, the recording medium having eccentric recording tracks, comprising the steps of:

(a) maintaining a position of the beam spot transmitted by a lens connected to a carriage, at a start track using a lens moving apparatus while the carriage is accelerated using a carriage moving apparatus until the carriage speed in a direction substantially perpendicular to the tracks is greater than or equal to a first predetermined speed;

(b) releasing the lens from maintaining the position at the start track so that the beam spot moves in the direction substantially perpendicular to the tracks;

(c) decelerating the beam spot transmitted by the lens connected to the carriage using at least one of the lens moving apparatus and the carriage moving apparatus until the beam spot speed reaches a second predetermined speed at or below which at least one of the carriage moving apparatus and the lens moving apparatus are operable to stop the beam spot at the destination track;

(d) counting a number of tracks crossed *by the beam spot* since the *beam spot left the* start [of said step (a)] *track*; and (e) decelerating at least one of the carriage and the lens using at least one of the carriage moving apparatus and the lens moving apparatus, respectively, based on [the] *a* difference between the [counted] number of tracks crossed and [the] *a* number of tracks to be crossed from the start track to the destination track while ensuring that the beam spot speed does not fall below [the] *an* absolute radial speed of *the tracks caused by* the eccentric *recording* tracks until the last track to be crossed is actually crossed.

*34. A method according to claim 2, wherein said measuring in substep (a1) utilizes a second time interval between zero-crossings in the tracking error signal determined by an interval of adjacent transitions of zero-crossings, the transition being from one polarity to an opposite polarity, the zero-crossings being generated when the beam spot passes a center of each track.*

*35. A method according to claim 3, wherein said decelerating in step (e) is carried out while the position servo means is enabled.*

*36. A method according to claim 11, wherein said moving in step (f) is carried out while position servo means is enabled, the position servo means keeping the fine tracking means at a neutral position on the carriage means by moving the carriage means according to a position signal, the position signal becoming zero when the fine tracking means is at the neutral position on the carriage means and becoming positive or negative when deviating from the neutral position to one direction or to the opposite direction, respectively.*

*37. A method according to claim 19, wherein said steps (a) through (c)* are carried out while the carriage is stationarily fixed.

*38. A method according to claim 19, wherein said steps (a) through (c) are carried out while position servo means is enabled, the position servo means keeping the fine tracking means at the neutral position of the carriage means by moving the carriage means according to a position signal, the position signal becoming zero when the fine tracking means is at the neutral position on the carriage means and becoming positive or negative when deviating from the neutral position to one direction or to the opposite direction, respectively.*

*39. A method according to claim 19, wherein said measuring in step (a) utilizes a time interval between zero-crossings in the tracking error signal measured by an interval or adjacent zero-crossings, the transition being from a first polarity to an opposite polarity, the zero-crossings being generated when the beam spot passes a center of each track.*

*40. A method according to claim 19, wherein said steps (b) and (c) utilize a fixed predetermined time interval which is chosen long enough, and a final instructed track which is chosen near enough to the destination track, for the fine tracking means to be able to stop surely at the destination track.*

*41. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means to accelerate the beam spot in a radial direction of the recording disk medium so that the beam spot speed exceeds an absolute radial speed of the recording tracks caused by an eccentricity of the recording tracks when the beam spot located on a start track is moved to a destination track.*

*42. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means to accelerate the beam spot using said fine tracking means to exceed an absolute radial speed of the recording track caused by an eccentricity of the recording disk medium and then further controlling said second control means to accelerate the beam spot using the carriage after the beam spot is accelerated by controlling said first control means.*

*43. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means and said second control means to decelerate the beam spot in a radial direction of the recording disk medium at a deceleration speed which exceeds an absolute radial speed of the recording tracks, after the beam spot is decelerated toward a destination track by the carriage and while the beam spot is further approaching the destination track.*

*44. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said second control means to decelerate the beam spot using said carriage means, and then controlling said first control means to further decelerate the beam spot using said fine tracking means before the beam spot speed is decelerated by the carriage to less than an absolute radial speed of the recording tracks caused by an eccentricity of the recording tracks.*

*45. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means to decelerate the beam spot using said fine tracking means, while the beam spot is decelerated by the carriage and before the beam spot speed is decelerated by the carriage to less than an absolute radial speed of the recording tracks caused by an eccentricity of the recording disk medium.*

*46. A movement control apparatus according to claim 45, wherein said third control means includes speed determination means for determining whether the beam spot speed has fallen below a predetermined speed, and*

*wherein said third control means controls said first control means to start deceleration of the beam spot by said fine tracking means after said speed determination means determines that the beam spot speed has fallen below the predetermined speed.*

*47. A movement control apparatus according to claim 46, wherein the predetermined speed is an absolute radial speed of the recording tracks caused by an eccentricity of the recording tracks.*

*48. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage;*

*third control means for controlling said first and second control means based upon the number of the recording tracks crossed, said third control means controlling said first control means to decelerate the beam spot using said fine tracking means after the beam spot is decelerated by the carriage and before the beam spot speed is decelerated by the carriage to less than an absolute radial speed of the recording tracks caused by an eccentricity of the recording disk medium; and*

*detection means for detecting a displacement of said fine tracking means from a neutral position of said fine tracking means on the carriage, said second control means controlling the carriage to reduce the displacement of said fine tracking means.*

*49. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means and said second control means before the beam spot jumps from a start track to a destination track, by accelerating the carriage while the beam spot is maintained at the start track by said fine tracking means.*

*50. A movement control apparatus in an optical disk apparatus directing a beam spot onto a recording disk medium having a plurality of recording tracks, the optical disk apparatus including a carriage for moving the beam spot across the recording tracks of the recording disk medium, said movement control apparatus comprising:*

*fine tracking means, mounted on the carriage, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling the carriage; and*

*third control means for controlling said first and second control means based upon the number of the recording tracks crossed, said third control means controlling said first control means and said second control means to cause the beam spot to jump from a start track to a destination track by accelerating the carriage until the carriage speed in a direction substantially perpendicular to the recording tracks is at least as fast as a first predetermined speed, while the beam spot is maintained at the start track by said fine tracking means, and then releasing the beam spot from the start track after accelerating the carriage, so that the beam spot moves in the direction substantially perpendicular to the recording tracks.*

*51. A movement control apparatus in an optical disk apparatus directing a beam spot onto a recording disk medium having a plurality of recording tracks, comprising:*

*fine tracking means for moving the beam spot across the recording tracks of the recording disk medium;*

*means for generating a tracking error signal representative of a displacement of the beam spot in a radial direction of the recording disk medium from one of the recording tracks;*

*means for measuring a time interval between zero crossings in the tracking error signal;*

*first control means for controlling said fine tracking means; and*

*second control means for controlling said first control means based upon the time interval to accelerate and decelerate the beam spot by said fine tracking means.*

*52. A movement control apparatus according to claim 51, wherein the optical disk apparatus includes a carriage for moving the beam spot across the recording tracks of the recording disk medium, said fine tracking means mounted on the carriage, and*

*wherein said movement control apparatus further comprises third control means for controlling the carriage, said third control means controlled by said second control means to accelerate and decelerate the beam spot based upon the time interval.*

*53. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and the first and second motors, controlling movement of the beam spot from a current recording track to a target recording track by outputting a first acceleration signal to the first motor starting when the beam spot is on the current recording track and continuing until the beam spot speed exceeds an absolute radial speed of the recording tracks caused by an eccentricity of the recording tracks, and then outputting a second acceleration signal to the first motor.*

*54. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and the first and second motors, controlling movement of the beam spot by outputting a first acceleration signal to the second motor to accelerate the beam spot and to output a second acceleration signal to the first motor after the beam spot speed increases*

*due to the second motor beyond an absolute radial speed of the recording tracks caused by an eccentricity of the recording tracks.*

*55. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and the first and second motors, controlling movement of the beam spot by outputting a deceleration signal to the second motor to produce a deceleration speed exceeding an absolute radial speed of the recording tracks caused by an eccentricity of the recording tracks, after the beam spot is decelerated toward a destination track by the carriage and when the beam spot is approaching a destination track.*

*56. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and the first and second motors, controlling movement of the beam spot when the beam spot approaches a target track by outputting a first deceleration signal to the first motor, and a second deceleration signal to the second motor before the beam spot speed is decelerated by the first motor below an absolute radial speed of the recording tracks caused by an eccentricity of the recording tracks.*

*57. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and the first and second motors, controlling movement of the beam spot by outputting deceleration signals to the first and second motors to decelerate the beam spot by the second motor while the beam spot speed being decelerated by the first motor before the beam spot speed is decelerated by the carriage to less than an absolute radial speed of the recording tracks caused by an eccentricity of the recording tracks.*

*58. An optical disk apparatus comprising:*

*a carriage movable across a plurality of recording tracks of a recording disk medium;*

*a first motor which moves said carriage;*

*an objective lens movable on said carriage means along a radial direction of the recording disk medium, said objective lens impinges a beam spot onto a recording track;*

*a second motor which moves said objective lens along a radial direction of the recording disk medium;*

*a circuit which detects a misregistration of the beam spot from a recording track in a radial direction of the recording disk medium, said circuit outputs a tracking error signal;*

*a counter, operatively connected to said circuit, which counts a number of tracks which the beam spot has crossed, based upon the tracking error signal;*

*a processor, operatively connected to said circuit, said counter and said first and second motors, controlling movement of the beam spot by outputting a first deceleration signal to said first motor to decelerate the beam spot and then outputting a second deceleration signal to said second motor to decelerate the beam spot by said second motor after the beam spot is decelerated by said first motor and before the beam spot is decelerated by the carriage to less than an absolute radial speed of the recording tracks caused by an eccentricity of the recording disk medium; and*

*detection means for detecting a displacement of said objective lens from a neutral position of said objective lens on the carriage, said processor controlling the carriage to reduce the displacement of the objective lens in dependence upon the displacement detected by said detection means.*

*59. A movement control apparatus in an optical disk apparatus directing a beam spot onto a recording disk medium having a plurality of recording tracks, the optical disk apparatus including a carriage movable across the recording tracks of the recording disk medium, a first motor coupled to move the carriage, an objective lens movably mounted on the carriage, movable along a radial direction*

*of the recording disk medium, focussing the beam spot onto one of the recording tracks and a second motor coupled to move the objective lens along the radial direction of the recording disk medium to cause the beam spot to move at a beam spot speed in conjunction with movement of the carriage, said movement control apparatus comprising:*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and the first and second motors, controlling movement of the beam spot before the beam spot jumps from a start track to a destination track, by outputting an acceleration signal to the first motor to accelerate toward the destination track, and outputting a track following signal to the second motor to maintain the beam spot at the start track while the carriage is accelerated by the first motor.*

*60. A movement control apparatus in an optical disk apparatus directing a beam spot onto a recording disk medium having a plurality of recording tracks, the optical disk apparatus including an objective lens, movable along a radial direction of the recording disk medium, focusing the beam spot onto one of the recording tracks, and a first motor coupled to move the objective lens along the radial direction of the recording disk medium, said movement control apparatus comprising:*

*a circuit to output a tracking error signal indicating a misregistration of the beam spot from one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and the first motor, to measure a time interval between zero-crossing signals of the tracking error signal and to output at least one of a first acceleration signal and a first deceleration signal to the first motor based upon the time interval.*

*61. A movement control apparatus according to claim 60, wherein the optical disk apparatus includes a carriage movable across the recording tracks of the recording disk medium, the objective lens mounted on the carriage and a second motor operatively connected to said processor and coupled to move the carriage.*

*62. A movement control apparatus according to claim 61,*

*wherein said processor outputs at least one of a second acceleration signal and a second deceleration signal to the second motor based upon the time interval.*

*63. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means to accelerate the beam spot in a radial direction of the recording disk medium so that the beam spot speed exceeds an absolute radial speed of the recording tracks caused by an eccentricity of the recording tracks when the beam spot located on a start track is moved to a destination track.*

*64. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means to accelerate the beam spot using said fine tracking means to exceed an absolute radial speed of the recording tracks caused by an eccentricity of the recording disk medium and then further controlling said second control means to accelerate the beam spot using said carriage means after the beam spot is accelerated by said fine track means to more than an absolute radial speed of the recording tracks caused by an eccentricity of the recording tracks.*

*65. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling of said first control means and said second control means to decelerate the beam spot in a radial direction of the recording disk medium at a deceleration speed which exceeds an absolute radial speed of the recording tracks, after the beam spot is decelerated toward a destination track by said carriage means and while the beam spot is approaching the destination track.*

*66. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said second control means to decelerate the beam spot using said carriage means, and then controlling said first control means to further decelerate the beam spot using said fine tracking means before the beam spot speed is decelerated by said carriage means to less than an absolute radial speed of the recording tracks caused by an eccentricity of the recording tracks.*

*67. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means to decelerate the beam spot using said fine tracking means at a beam spot speed greater than an absolute radial speed of the recording tracks caused by an eccentricity of the recording disk medium while the beam spot is decelerated by said carriage means.*

*68. An optical disk apparatus according to claim 67,*

*wherein said third control means includes speed determination means for determining whether the beam spot speed has fallen below a predetermined speed, and*

*wherein said third control means controls said first control means to start deceleration of the beam spot by said fine tracking means after said speed determination means determines that the beam spot speed has fallen below the predetermined speed.*

*69. An optical disk apparatus according to claim 68,*

*wherein the predetermined speed is an absolute radial speed of the recording tracks caused by an eccentricity of the recording tracks.*

*70. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means to decelerate the beam spot using said fine tracking means while the beam spot is decelerated by said carriage means before the beam spot is decelerated by said carriage means to less than an absolute radial speed of the recording tracks caused by an eccentricity of the recording disk medium.*

*71. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means and said second control means before the beam spot jumps from a start track to a destination track, by accelerating said carriage means while the beam spot is maintained at the start track by said fine tracking means.*

*72. An optical disk apparatus directing a beam spot onto a recording disk medium having a plurality of recording tracks to access data on the recording disk medium, said optical disk apparatus comprising:*

*carriage means for moving the beam spot across the recording tracks of the recording disk medium;*

*fine tracking means, mounted on said carriage means, for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*first control means for controlling said fine tracking means;*

*second control means for controlling said carriage means; and*

*third control means for controlling said first and second control means based upon the number of the recording tracks crossed, said third control means controlling said first control means and said second control means to cause the beam spot to jump from a start track to a destination track by accelerating said carriage means while the beam spot is maintained at the start track by said fine tracking means, and then releasing the beam spot from the start track so that the beam spot moves in the direction substantially perpendicular to the recording tracks at a beam spot speed at least as fast as a predetermined speed in a direction substantially perpendicular to the recording tracks.*

*73. An optical disk apparatus directing a beam spot onto a recording disk medium having a plurality of recording tracks to access data on the recording disk medium, said optical disk apparatus comprising:*

*fine tracking means for moving the beam spot across the recording tracks of the recording disk medium;*

*means for generating a tracking error signal representative of a displacement of the beam spot in a radial direction of the recording disk medium from one of the recording tracks;*

*means for obtaining a number of the recording tracks crossed by the beam spot, based upon the tracking error signal;*

*means for measuring a time interval between zero crossings in the tracking error signal;*

*first control means for controlling said fine tracking means; and*

*second control means for controlling said first control means based upon the time interval to accelerate and decelerate the beam spot.*

*74. An optical disk apparatus according to claim 73, further comprising:*

*carriage means for moving the beam spot across the recording tracks of the recording disk medium, said fine tracking means mounted on said carriage means; and*

*third control means for controlling said carriage means, said third control means controlled by said second control means to accelerate and decelerate the beam spot based upon the time interval.*

*75. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and said first and second motors, controlling movement of the beam spot from a current recording track to a target recording track by outputting a first acceleration signal to said first motor starting when the beam spot is on the current recording track and continuing until the beam spot speed exceeds an absolute radial speed of the recording tracks caused by an eccentricity of the recording tracks, and then outputting a second acceleration signal to said first motor.*

*76. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and said first and second motors, controlling*

*movement of the beam spot by outputting a first acceleration signal to said second motor to accelerate the beam spot beyond an absolute radial speed of the recording tracks caused by an eccentricity of the recording disk medium and to then output a second acceleration signal to said first motor.*

*77. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal; and*

*a processor, operatively connected to said circuit, said counter and said first and second motors, controlling movement of the beam spot by outputting a deceleration signal to said second motor to produce a deceleration speed exceeding an absolute radial speed of the recording tracks caused by an eccentricity of the recording tracks, after the beam spot is decelerated toward a destination track by said carriage and when the beam spot is approaching the destination track.*

*78. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and said first and second motors, controlling said first motor to decelerate the beam spot when the beam spot approaches a target track by outputting a first deceleration signal to said first motor, and further controlling said second motor to further decelerate the beam spot by outputting a second deceleration signal to said second motor before the beam spot speed is decelerated by said first motor below an absolute radial speed of the recording tracks caused by an eccentricity of the recording disk medium.*

*79. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and said first and second motors, controlling movement of the beam spot by outputting deceleration signals to said first and second motors to decelerate the beam spot by said second motor while the beam spot speed being decelerated by said first motor and before the beam spot is decelerated by said carriage to less than an absolute radial speed of the recording tracks caused by an eccentricity of the recording disk medium.*

*80. An optical disk apparatus directing a beam spot onto a recording disk medium having a plurality of recording tracks to access data on the recording disk medium, said optical disk apparatus comprising:*

*a carriage movable across the recording tracks of the recording disk medium;*

*a first motor coupled to move said carriage;*

*an objective lens movably mounted on said carriage means, movable along a radial direction of the recording disk medium, focussing the beam spot onto one of the recording tracks;*

*a second motor coupled to move said objective lens along the radial direction of the recording disk medium to cause the beam spot to move at a beam spot speed in conjunction with movement of said carriage;*

*a circuit to output a tracking error signal indicating misregistration of the beam spot from the one of the recording tracks in a radial direction of the recording disk medium;*

*a counter, operatively connected to said circuit, to count a number of the recording tracks crossed by the beam spot, based upon the tracking error signal;*

*a processor, operatively connected to said circuit, said counter and said first and second motors, controlling movement of the beam spot, before the beam spot jumps from a start track to a destination track, by outputting an acceleration signal to said first motor to accelerate toward the destination track, and outputting a track following signal to said second motor to maintain the*

*beam spot at the start track while said carriage is accelerated by said first motor.*

*81. An optical disk apparatus directing a beam spot onto a recording disk medium having a plurality of recording tracks to access data on the recording disk medium, said optical disk apparatus comprising:*

*an objective lens, movable along a radial direction of the recording disk medium, focusing the beam spot onto one of the recording tracks;*

*a first motor coupled to move said objective lens along the radial direction of the recording disk medium;*

*a circuit to output a tracking error signal indicating a misregistration of the beam spot from one of the recording tracks in a radial direction of the recording disk medium;* a counter, operatively connected to said circuit, to count a number of the recording tracks crossed by the beam spot, based upon the tracking error signal; and

*a processor, operatively connected to said circuit, said counter and said first motor, to measure a time interval between zero-crossing signals of the tracking error signal and to output at least one of a first acceleration signal and a first deceleration signal to said first motor based upon the time interval.*

*82. An optical disk apparatus according to claim 81, further comprising:*

*a carriage movable across the recording tracks of the recording disk medium, said objective lens mounted on said carriage; and*

*a second motor operatively connected to said processor and coupled to move said carriage.*

*83. An optical disk apparatus according to claim 82,*

*wherein said processor outputs at least one of a second acceleration signal and a second deceleration signal to said second motor based upon the time interval.*

*84. A method of changing a position of an optical beam having a beam spot relative to a plurality of tracks of a recording medium from a start track to a destination track, comprising the steps of:*

*(a) accelerating the beam spot until a beam spot speed in a direction substantially perpendicular to the tracks exceeds an absolute radial speed of the tracks of the recording medium, caused by an eccentricity of the tracks, before a first track to be crossed is actually crossed;*

*(b) continuing to move the beam spot after said accelerating in step (a) ends; and*

*(c) obtaining a number of the tracks crossed since said accelerating started in step (a).*

*85. A method according to claim 84, further comprising the steps of:*

*(d) measuring a time interval for a track crossing while the beam spot is moving;*

*(e) obtaining a first time interval difference between the time interval for the track crossing and a first predetermined time interval which corresponds to a predetermined speed faster than the absolute radial speed of the tracks; and*

*(f) accelerating or decelerating the beam spot according to the time interval to make the time interval of the track crossings essentially equal to the first predetermined time interval without stopping the beam spot at each track.*

*86. A method according to claim 85,*

*wherein said measuring in step (d) comprises measuring a second time interval corresponding to one-half of a track crossing, and*

*wherein said obtaining in step (e) comprises obtaining a second time interval difference between the second time interval corresponding to one-half of a track crossing and a second predetermined time interval.*

*87. A method according to claim 85,*

*wherein said measuring in step (d) comprises measuring a second time interval corresponding to one-quarter of a track crossing, and*

*wherein said obtaining in step (e) comprises obtaining a second time interval difference between the second time interval corresponding to one-quarter of a track crossing and a second predetermined time interval.*

*88. A method according to claim 84, further comprising the steps of:*

*(d) measuring a time interval of a track crossing while the beam spot is moving;*

*(e) obtaining a time interval difference between the time interval for the track crossing and a first predetermined time interval; and*

*(f) decelerating the beam spot according to the time interval difference to make the time interval of the track crossing essentially equal to the first predetermined time interval without stopping the beam spot at each track.*

*89. A method according to claim 88,*

*wherein said measuring in step (d) comprises measuring a second time interval corresponding to one-half of a track crossing, and*

*wherein said obtaining in step (e) comprises obtaining a second time interval difference between the second time interval corresponding to one-half of a track crossing and a second predetermined time interval.*

*90. A method according to claim 88,*

*wherein said measuring in step (d) comprises measuring a second time interval corresponding to one-quarter of a track crossing, and*

*wherein said obtaining in step (e) comprises obtaining a second time interval difference between the second time interval corresponding to one-quarter of a track crossing and a second predetermined time interval.*

*91. A method according to claim 88, further comprising repeating said measuring in step (d) and said decelerating in step (f) with a renewed predetermined time interval.*

*92. A method according to claim 84, further comprising the step of (d) controlling the beam spot speed to maintain the beam spot speed no greater than a predetermined speed at which the beam spot can be stopped at the destination track, until the beam spot reaches a predetermined track whose number is calculated by a program prepared in advance according to the number of tracks to be crossed from the start track to the destination track.*

*93. A method of stopping an optical beam having a beam spot moving at a beam spot speed relative to a plurality of tracks of a recording medium from a start track to a destination track, comprising the steps of:*

*(a) decelerating the beam spot transmitted by a lens connected to a carriage using at least one of a lens moving apparatus and a carriage moving apparatus until the beam spot speed reaches a predetermined speed at or below which at least one of the carriage moving apparatus and the lens moving apparatus are operable to stop the beam spot at the destination track;*

*(b) obtaining a number of tracks crossed by the beam spot since the beam spot left the start track; and*

*(c) decelerating at least one of the carriage and the lens using at least one of the carriage moving apparatus and the lens moving apparatus, respectively, based on*

*a difference between the number of tracks crossed and a number of tracks to be crossed from the start track to the destination track while ensuring that the beam spot speed does not fall below an absolute radial speed of the tracks caused by an eccentricity of the recording medium until the last track to be crossed is actually crossed.*

*94. A method according to claim 93, further comprising the following steps performed prior to steps (a)–(c):*

*(d) maintaining a position of the beam spot transmitted by the lens, at a start track using the lens moving apparatus while the carriage is accelerated using the carriage moving apparatus until a carriage speed in a direction substantially perpendicular to the tracks is greater than or equal to a second predetermined speed; and*

*(e) releasing the lens from the position at the start track maintained in step (d) so that the beam spot moves in the direction substantially perpendicular to the tracks.*

* * * * *